US012737106B2

(12) United States Patent
Sasanuma et al.

(10) Patent No.: US 12,737,106 B2
(45) Date of Patent: Sep. 15, 2026

(54) EQUIPMENT CONTROL DEVICE, EQUIPMENT CONTROL METHOD, AND PROGRAM

(71) Applicant: Nissan Motor Co., Ltd., Kanagawa (JP)

(72) Inventors: Yasutomo Sasanuma, Kanagawa (JP); Jun Ueda, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 201 days.

(21) Appl. No.: 18/565,912

(22) PCT Filed: Jun. 3, 2021

(86) PCT No.: PCT/JP2021/021226
§ 371 (c)(1),
(2) Date: Nov. 30, 2023

(87) PCT Pub. No.: WO2022/254665
PCT Pub. Date: Dec. 8, 2022

(65) Prior Publication Data

US 2024/0370154 A1 Nov. 7, 2024

(51) Int. Cl.
*G06F 3/04847* (2022.01)
*B60H 1/00* (2006.01)
(Continued)

(52) U.S. Cl.
CPC ..... *G06F 3/04847* (2013.01); *B60H 1/00985* (2013.01); *B60K 35/10* (2024.01); (Continued)

(58) Field of Classification Search
CPC ............. G06F 3/04847; G06F 3/04883; B60H 1/00985; B60K 35/10; B60K 35/22; B60K 35/28
See application file for complete search history.

(56) References Cited

U.S. PATENT DOCUMENTS 10,576,807 B2 3/2020 Mizuno et al.
2014/0096003 A1* 4/2014 Vu .......................... B60J 7/043 715/727

(Continued)

FOREIGN PATENT DOCUMENTS

DE 4119475 A1 12/1992
EP 2896524 B1 4/2018

(Continued)

*Primary Examiner* — Seth A Silverman
(74) *Attorney, Agent, or Firm* — Osha Bergman Watanabe & Burton LLP

(57) ABSTRACT

An equipment control device includes a controller that controls a control target based on a touch operation by a user on a touch panel display. The display displays a display screen that includes a control target icon resembling the control target, and a plurality of touch areas an effective area that enables the touch operation for operating the control target; and detects a first gesture and a second gesture from the touch operation. The second gesture is different from the first gesture, and has a fixed direction. The controller in a case where the display detects the first gesture in the effective area any one of the plurality of the touch areas, executes at least one of selecting the control target and controlling a direction of the control target; in a case where the display detects the second gesture in the one touch area effective area and the second gesture has a direction away from the control target icon, increases a control amount of the control target; and in a case where the display detects the second gesture in the effective area and the second gesture has a direction approaching the control target icon, decreases a control amount of the control target.

24 Claims, 15 Drawing Sheets

(51) Int. Cl.
*B60K 35/10* (2024.01)
*B60K 35/22* (2024.01)
*B60K 35/28* (2024.01)
*G06F 3/04883* (2022.01)

(52) U.S. Cl.
CPC .............. *B60K 35/22* (2024.01); *B60K 35/28* (2024.01); *G06F 3/04883* (2013.01)

(56) References Cited

U.S. PATENT DOCUMENTS

| | | | | |
|---|---|---|---|---|
| 2014/0232671 | A1* | 8/2014 | Chaudhri | G06F 9/451<br>345/173 |
| 2015/0148968 | A1* | 5/2015 | Sasaki | F24F 11/30<br>700/276 |
| 2016/0226674 | A1* | 8/2016 | Kangshang | H04W 12/08 |
| 2017/0140482 | A1* | 5/2017 | Salter | G08C 19/16 |

FOREIGN PATENT DOCUMENTS

| | | | |
|---|---|---|---|
| JP | 2010211500 | A | 9/2010 |
| JP | 2013061858 | A | 4/2013 |
| JP | 2013097519 | A | 5/2013 |
| JP | 2020042621 | A | 3/2020 |

* cited by examiner

AIR CONDITIONER
AUTO
25.0 °C
25.0 °C
SYNC
11
12
13
40
41
42
43
50
51
52
70
81
81a
81b
82
82a
82b
91
91a
91b
91c
92
92a
92b
92c
610
610a
611
620
621
630
631
640
641
650
651
660
661
x
y
z

EQUIPMENT CONTROL DEVICE, EQUIPMENT CONTROL METHOD, AND PROGRAM

TECHNICAL FIELD

The present invention relates to an equipment control system device, an equipment control system method, and a program.

BACKGROUND ART

A touch-type operation input device for a vehicle is known that, by continuously touching a touch surface thereof, changes settings of a temperature setting and airflow setting for controlling an air conditioner. For example, an input device described in Patent Document 1 includes a running state specifying means for specifying whether a vehicle is running, a touch operation input means for receiving a continuous touch operation, and a control means for changing control parameters. On a temperature setting screen displayed on a screen display unit, memory images are drawn at equal intervals around a rotation axis, and guidance images that rotate around the rotation axis indicating the memory images are drawn, and these guidance images can be moved by sliding operations on the touch surface. By changing the indicated positions of the guidance images, the current set values of control parameters indicating the temperature setting and airflow setting can be changed, and even when the content of the operation for changing the set values of the control parameters is the same when the vehicle is running and when the vehicle is stopped, the content of the change is different.

PRIOR ART DOCUMENT

Patent Document

Patent Document 1: JP 2013-97519 A

SUMMARY OF INVENTION

Problems to be Solved by Invention

However, in the above-mentioned touch-type operation input device for a vehicle, the temperature setting screen displayed on the screen display unit only displays a memory indicating the magnitude of the temperature and a guidance image indicating the memory, and thus there is a problem in that a user cannot intuitively know which part inside the vehicle the air conditioning is to be controlled, and the operability is low.

The problem to be solved by the present invention is to provide an equipment control system device, an equipment control system method and an equipment with improved operability.

Means for Solving Problems

The present invention solves the above-mentioned problems by causing a display to: display a display screen that includes a control target icon and a plurality of touch areas that enables touch operations for operating the control target; detect a first gesture and a second gesture from a touch operation, and in a case where the first gesture is detected in the touch area, execute at least one of selecting the control target and controlling a direction of the control target; in a case where the second gesture is detected in the touch area and the second gesture has a direction away from the control target icon, increase a control amount of the control target; and in a case where the second gesture is detected in the touch area and the second gesture has a direction approaching the control target icon, decrease a control amount of the control target.

Effects of Invention

With the present invention, it is possible to improve operability when operating an air conditioner by touch operation on a display screen.

MODES FOR CARRYING OUT THE INVENTION

Figure 1:
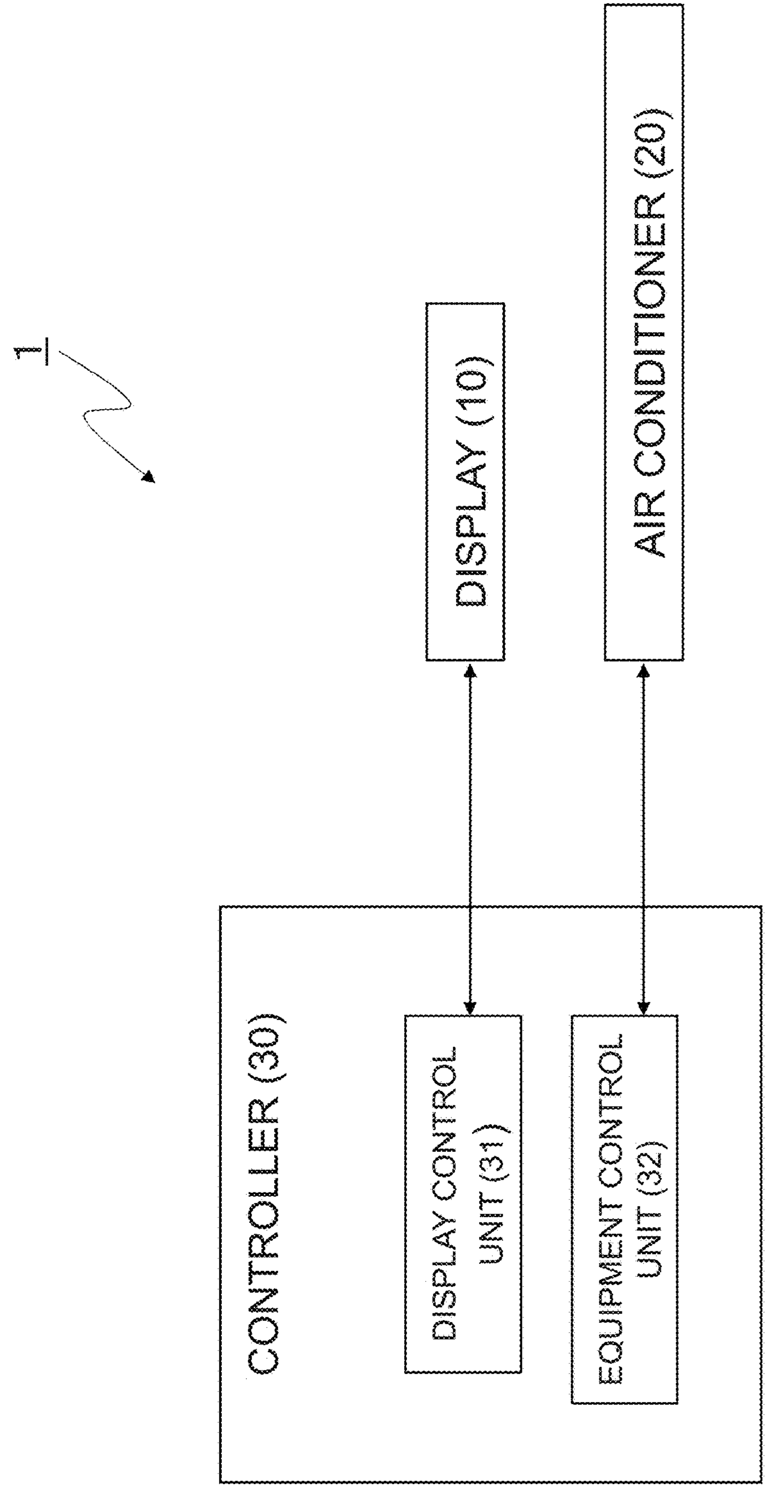
FIG. 1 is a block diagram illustrating a control system according to an embodiment of the present invention.

An embodiment of a control system according to the present invention will be described below based on the drawings. FIG. 1 is a block diagram illustrating an control system according to an embodiment of the present invention. The control system 1 is a system installed in a vehicle, and includes a display 10, an air conditioner 20, and a controller 30. The control system 1 according to the present embodiment receives touch operations via the touch panel type display 10 and controls the air conditioner 20 based on the touch operations. Note that in the present embodiment, the control target of the control system 1 is an air conditioner 20; however, the control target is not limited to the air conditioner 20, and may be another device or equipment.

Figure 2:
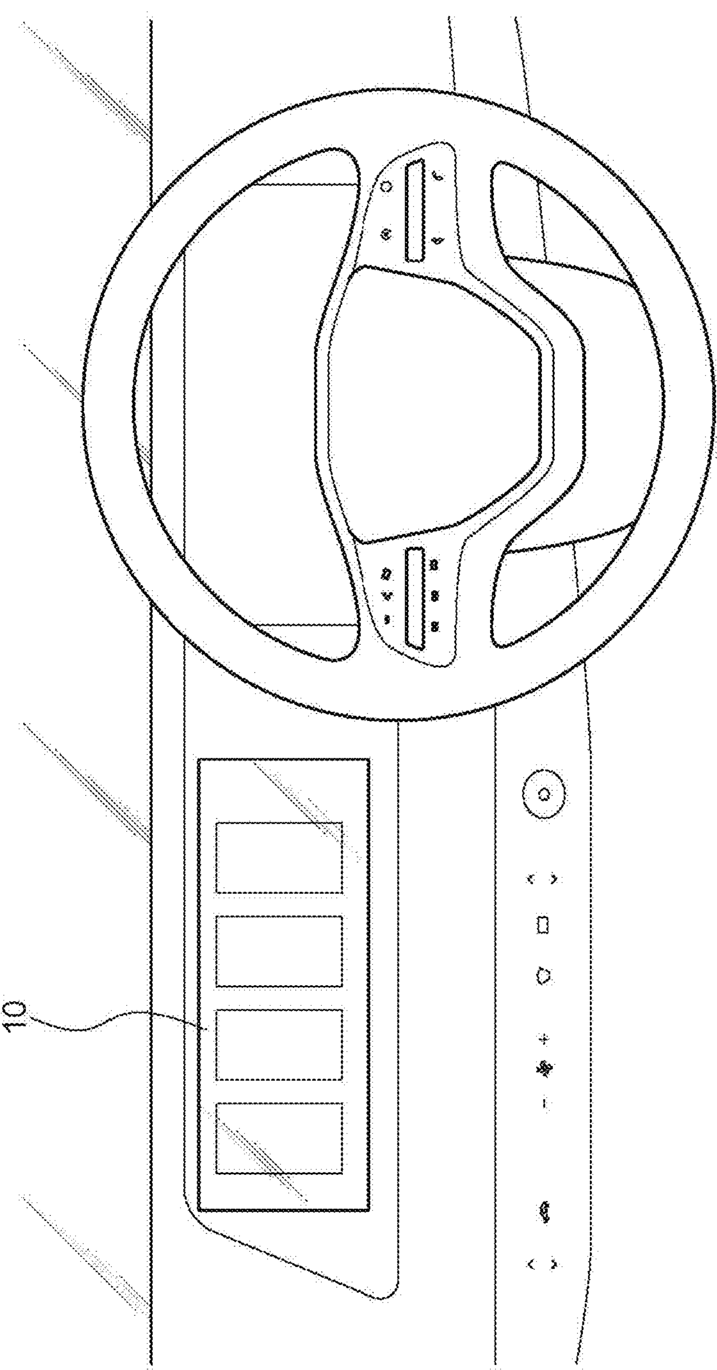
FIG. 2 is a front view of a dashboard with the display in FIG. 1.

The display 10 is a touch panel type display and is installed the vehicle. The touch panel type display 10 is provided with a pressure sensor, and detects a touch operation by a user by measuring the pressing force applied to the display 10 during a touch operation based on a resistance value, voltage, or the like. The mechanism of the pressure sensor is not particularly limited, and methods known at the time of filing may be used as appropriate. In addition, the touch panel is not limited to a pressure type, and may be another type such as an electrostatic type. FIG. 2 is a front view of the vicinity of a dashboard provided with a touch panel. As illustrated in FIG. 2, the display 10 is a display on a front portion of the dashboard (center display), and is arranged between the driver's seat and the passenger seat. The display 10 is provided at a position where it can be touched by a passenger sitting in the driver's seat (hereinafter also referred to as "driver") and a passenger sitting in the passenger seat (hereinafter also referred to as "passenger seat passenger"). As will be described later, the air conditioner 20 is able to blow air independently to the driver and front passenger, and by arranging the display 10 at a position where the driver and front passenger can touch it, the driver and front passenger can independently control air conditioning in their seat space. Note that in the following description, the air conditioner 20 refers to a device that adjusts the temperature of the seat space and a device that prevents glass from fogging, and corresponds to a so-called air conditioner. In addition, the display 10 does not necessarily need to be arranged in a position where both the driver and the passenger in the passenger seat can touch it, and may be arranged in a position where only the driver can touch it, for example. Moreover, the display 10 is not limited to being arranged on the dashboard, and may be arranged at a position that is touched by a passenger in a rear seat, for example.

The passenger selects an operation of the air conditioner 20 from a menu screen by a touch operation of touching the display 10 with a finger or an operating device instead of the finger, and displaying a screen for operating the air conditioner 20. Note that in the following description, a touch operation using a finger will mainly be described; however, in this embodiment, a touch operation using an operating device instead of a finger may be used. The passenger touches the display screen of the display 10 to operate the air conditioner 20. A touch operation is a pointing operation performed by a gesture using a finger, such as touching an icon or button displayed on the display 10 or bringing a finger close to an icon or button. Touch operations include a tap (touch the screen once), a double tap (touch the screen twice), a long tap (touch the screen for a long time), a swipe (slide the finger over the screen while touching the screen (tracing with the finger)), a flick (moving fingers on the screen in a quick flicking motion), a pinch-in/pinch-out (touching the screen with two fingers and moving the fingers closer together or farther away), and the like. The touch operation is not limited to a first gesture of touching one or more points on the screen with a finger, but may also include a second gesture of moving a contact point of the finger while touching the screen. Further, in the touch operation, the finger does not need to directly touch the display screen, and may be so-called hovering, in which a finger or the like is brought close to the display screen. Note that the touch operation method is not limited to these, and other methods may be used. Note that the following description will mainly describe an embodiment using touch operations when directly touching the display screen with a finger, or the like, but in the case of hovering, the following explanation regarding "finger contact" may be replaced with hovering.

The air conditioner 20 is a device that adjusts the temperature inside the vehicle, and is an air conditioner. The air conditioner 20 is composed of an air conditioner system including a compressor and the like, and has an air outlet for blowing air into the passenger seat space, a defroster for removing fog from a windshield and/or side glass, and the like. The air outlet is provided on the dashboard or a portion under the dashboard. The air outlet on the dashboard is a front air outlet, and is arranged to blow air toward the front of the seat. The air outlet at a portion under the dashboard is a lower air outlet, and is arranged to blow air toward the bottom of the seat. A direction of the air changes depending on a direction of fins inside the air outlet. The defroster has an air outlet that blows air from a front portion of the dashboard along the windshield, and outputs the air generated by the air conditioner system.

The controller 30 is composed of a computer equipped with hardware and software, and includes a memory that stores a program, a CPU that executes the program stored in this memory, and the like. The controller 30 has a display control unit 31 and an equipment control unit 32 as functional blocks, and a program for achieving the functions of the display control unit 31 and the equipment control unit 32 is stored in a memory. The computer included in the controller 30 executes the program to achieve the functions of the functional blocks. In addition, the controller 30 is connected to the display 10 and the air conditioner 20 via a CAN communication network or the like, and in addition to the display 10, controls the air conditioner 20 as a control target. The controller 30 includes not only the display control unit 31 and the equipment control unit 32, but also includes a control block for controlling various systems in the vehicle interior, such as a function to control the audio system, and controls not only the display 10 and the air conditioner 20 but also other in-vehicle devices. Note that various systems included in the vehicle are controlled by a plurality of ECUs, and in FIG. 1, the plurality of ECUs are illustrated as the controller 30. It should also be noted that a device including the controller 30 corresponds to the "equipment control system device" of the present invention.

The display control unit 31 controls the display screen of the display 10. In addition, in a case where a touch operation is detected on the display, the display control unit 31 receives an operation command according to the position of the touch operation on the display screen and the type of the touch operation. The display control unit 31 generates an image representing the operating state of the air conditioner 20 on the display screen, and outputs the image to the display 10. The operating state of the air conditioner 20 is displayed so that the passenger can identify the operating state according to the changing shape, color, pattern, animation, or the like of images included in the display screen. Moreover, the display control unit 31 outputs the received operation command to the equipment control unit 32.

The equipment control unit 32 controls the air conditioner 20 based on touch operations. The equipment control unit 32 identifies control items from the content of the touch operation, and depending on the identified control items performs control such as turning ON/OFF the system, selecting the air outlet, and controlling the airflow, temperature, air direction, and the like of the air blown from the air outlet. The equipment control unit 32 outputs control commands according to control items to the air conditioner 20. The control items are determined in advance according to the specifications of the air conditioner, such as airflow setting, air direction setting, temperature setting, and selection of the air outlet. Control items are selected by touch operations on the display 10 or by switches provided in the vehicle. In addition, the equipment control unit 32 manages the operating state of the air conditioner 20 and the environment inside the vehicle. The environment inside the vehicle is managed by using temperature sensors and the like.

The control of the air conditioner 20 by the equipment control unit 32 and the control of the display screen by the display control unit 31 are linked by an application (software). The display control unit 31 receives an operation command via a touch operation on the display screen, and the equipment control unit 32 specifies a control item according to the operation command and outputs a control command according to the control item to the air conditioner 20. In addition, in a case where the air conditioner 20 is controlled by automatic setting and the operation of the air conditioner 20 is changed according to the temperature environment inside the vehicle, the equipment control unit 32 transmits a signal indicating the changed operating state to the display control unit 31. The display control unit 31 displays the current operating state of the air conditioner 20 on the display 10 based on the signal received from the equipment control unit 32. Thus, the passenger can operate the air conditioner 20 by using the display 10 and check the operating state of the air conditioner 20 from the display screen of the display 10.

Figure 3:
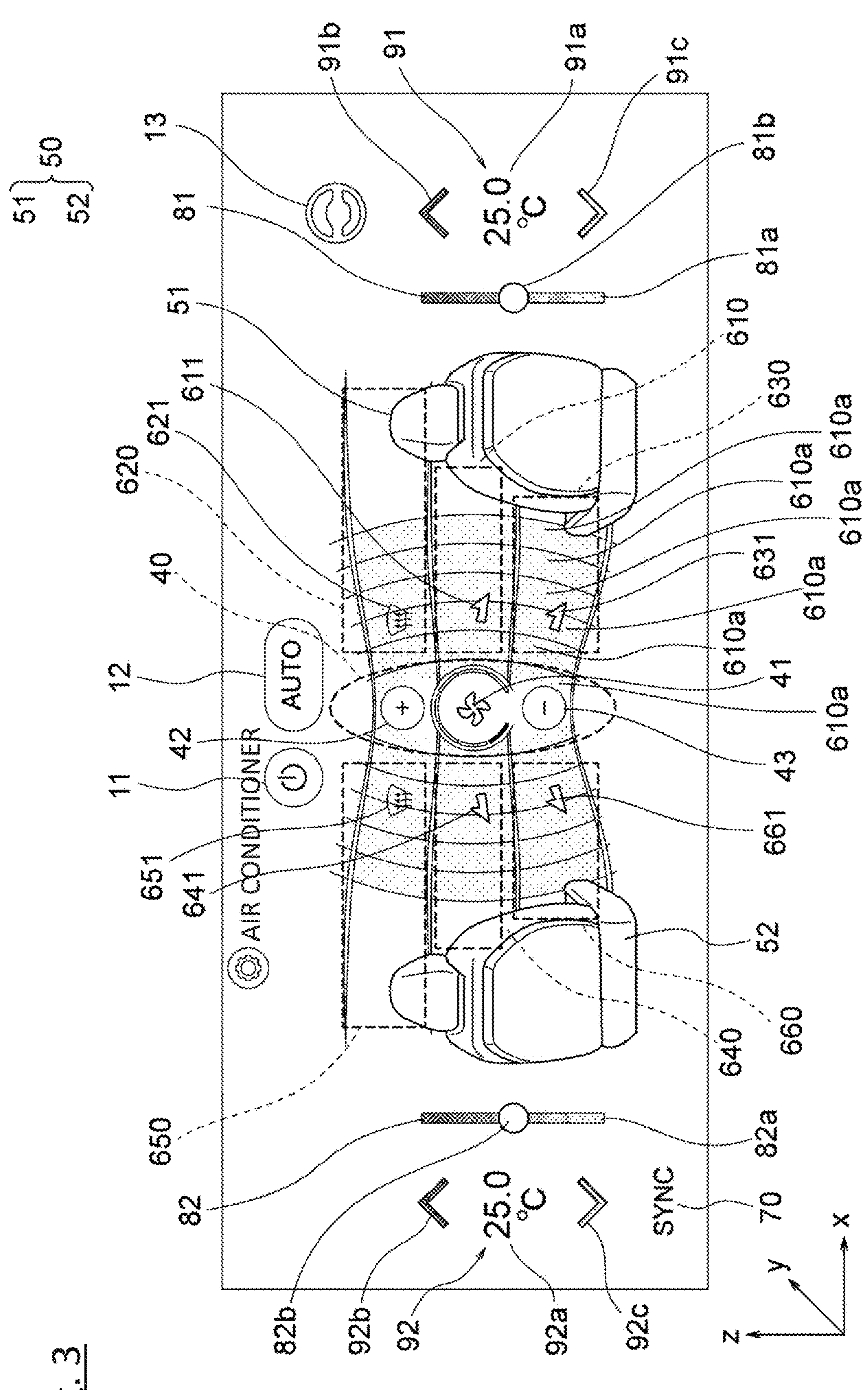
FIG. 3 is a diagram illustrating a display screen of the display in FIG. 1.
Figure 4:
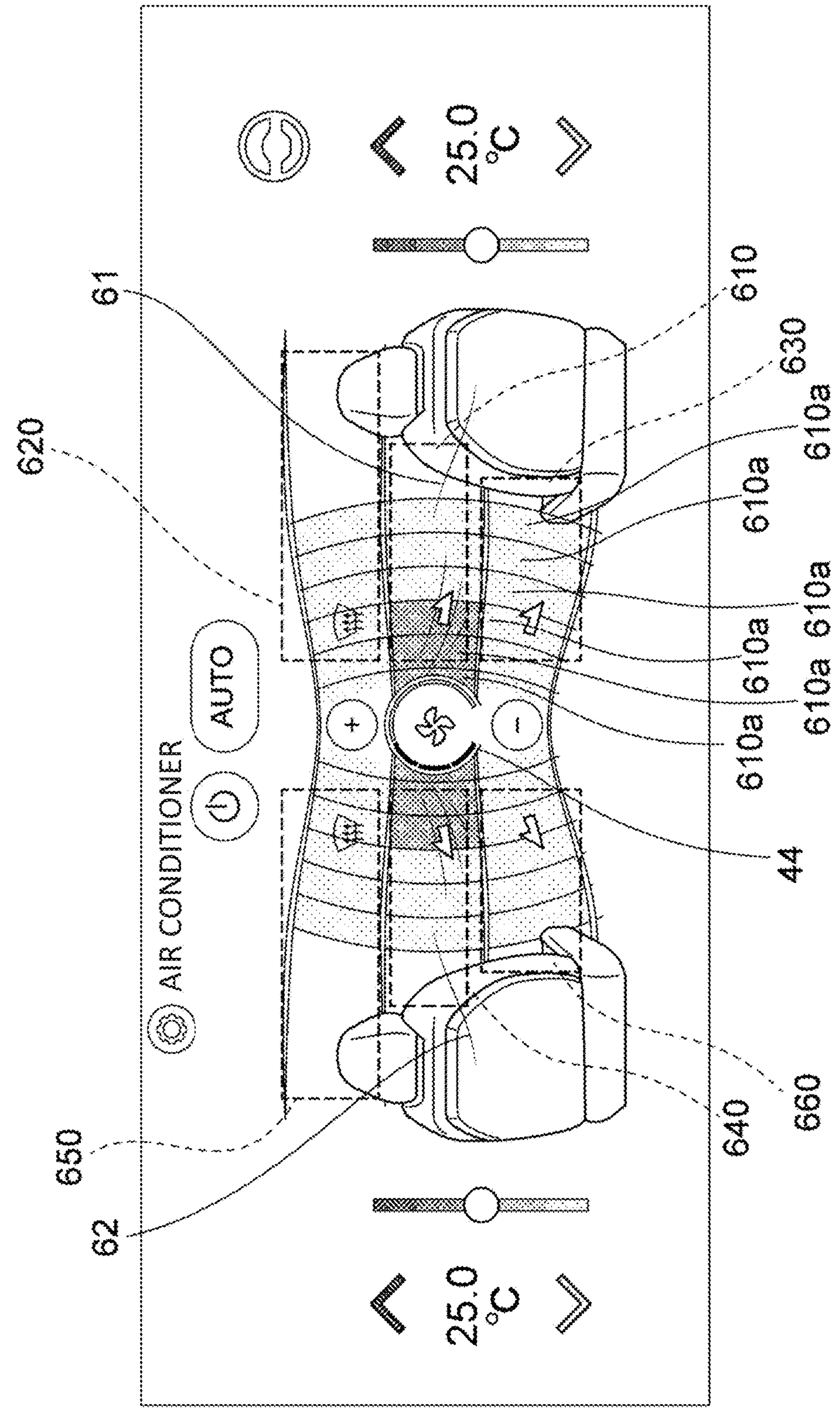
FIG. 4 is a diagram illustrating a display screen of the display in FIG. 1.
Figure 5:
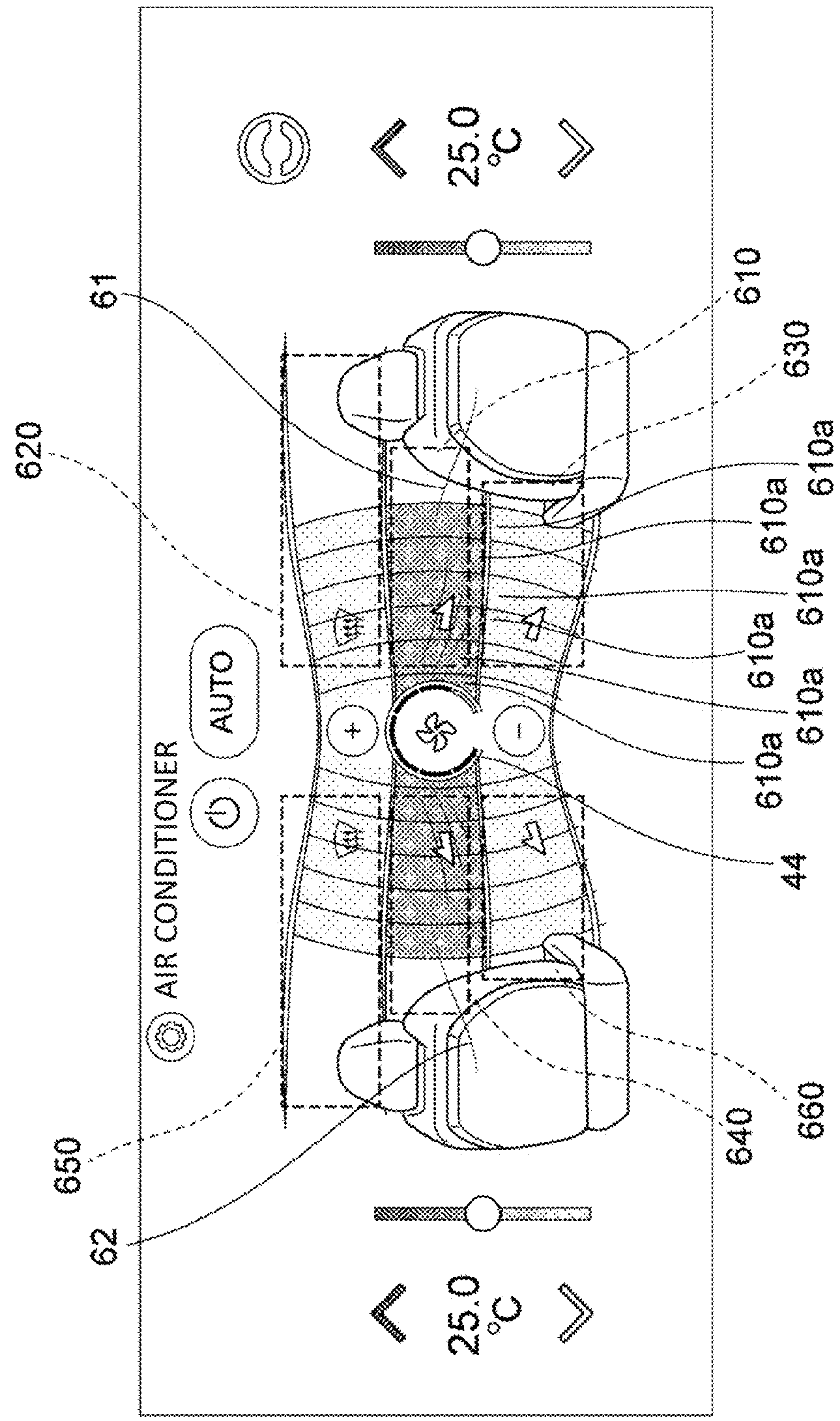
FIG. 5 is a diagram illustrating a display screen of the display in FIG. 1.

Next, a method of controlling the air conditioner 20 using the display 10 and a display screen of the display 10 will be described with reference to FIGS. 3 to 5. FIGS. 3 to 5 illustrate display screens of the display 10, which are operation screens for controlling the air conditioner 20. Note that the control method described below is effective in a case where the display screen of the display 10 is displaying the operation screen of the air conditioner 20. The display screen of the display 10 is a horizontally elongated display. Moreover, the display screens illustrated in FIGS. 3 to 5 are displayed when operating the air conditioner 20 at the front of the vehicle. In FIGS. 3 to 5, the x-axis represents the vehicle width direction (left-right direction), the y-axis represents the depth in the vehicle's traveling direction (forward direction), and the z-axis represents the height direction (up-down direction).

When the passenger turns on a main switch of the display 10, the display control unit 31 displays a top screen on the display 10. From the menu display on the top screen, the passenger touches "air conditioner" as an operation target, and the display 10 detects the touch operation. The controller 30 starts an application for operating the air conditioner 20. Note that the application for controlling the air conditioner 20 may be activated before selecting the "air conditioner (air conditioner)". The display control unit 31 outputs control commands to the display 10 in order to display the display screens illustrated in FIGS. 3 to 5 on the display 10. Note that when operating the air conditioner 20, the initial display screen of the display 10 may display the items that were set the previous time. For example, the airflow, air direction, temperature, and the like when the air conditioner 20 finished operating the previous time are displayed on the current initial display screen. Alternatively, in a case where the operation of the air conditioner 20 is determined by the initial settings, the operation contents of the initial settings are displayed on the current initial display screen. The initial settings may be changeable by the passenger or may be changed on the system side.

As illustrated in FIG. 3, the display screen of the display 10 includes a main switch button 11, a mode switch button 12, a steering wheel icon 13, a reference area image 40, a seat image 50, a synchronization switch button 70, temperature adjustment bars 81 and 82, and temperature display images 91 and 92. The main switch button 11 is a button for switching the air conditioner 20 ON and OFF by a touch operation. The button display will be outlined in white in the OFF state, and the outlined area will be orange in the ON state. Note that in the following description, the ON/OFF display of other button icons is similarly represented by a white outline display and an orange outline display. The mode switch button 12 is a switch for switching the operation mode (AUTO, MANUAL) of the air conditioner 20. The steering wheel icon 13 is located on the right side of the display screen, and indicates that the seat on the right side of the display screen is the driver's seat. Note that the icons and buttons displayed on the display screen, depending on the types thereof, define areas in which touch operations are enabled in order to control the air conditioner 20. Therefore, the user is able to operate the air conditioner 20 by touching the icons or buttons.

The reference area image 40 is an image within a predetermined range with a center point of the display screen as a center of the area, and includes at least a fan icon 41. The fan icon 41 is represented in a center portion of the display screen by a figure imitating an air outlet (fan). In other words, the fan icon 41 is an icon that imitates the air conditioner 20 that is the control target. The display screen of the display 10 includes a reference area image 40 representing a reference area and a seat image 50 representing a seat. The reference area is an area set for determining a direction for performing a touch operation (hereinafter also referred to as a directional touch operation) having a certain direction (vector), such as a tap, swipe, or flick. In other words, in a case of performing a directional touch operation on the display screen for adjusting the airflow or the like as described later, the reference area is provided to indicate, on the display screen, the position where a finger touches in a directional touch operation or the direction in which the finger moves. Note that the directional touch operation, in other words, may be a touch operation in which the movement of a contact point such as a finger accompanying the touch operation has a vector. In the examples illustrated in FIGS. 3 to 5, the reference area is a vertically elongated area in the up-down direction (the area surrounded by a dotted ellipse) centering on the fan icon (fan FIG. 41. Note that the reference area is defined as a closed space such as a rectangle, circle, or ellipse. The reference area image does not necessarily need to be an image that allows the passenger to recognize the boundary of the reference area, and it is sufficient that the image includes at least the fan icon 41. In other words, a reference area may be set on the display screen so that the passenger can specify the direction in which to move his or her finger and/or the position to first touch the finger when operating the screen using a directional touch operation.

The seat image 50 is drawn as the seat looks when viewed from the rear. The seat image 50 includes a right seat image 51 and a left seat image 52. In a case where the traveling direction (forward direction) of the vehicle is the front, the right seat image 51 represents the right seat (driver's seat), and the left seat image 52 represents the left seat (passenger seat). The seat image 50 corresponds to an icon indicating a position of the user. For example, the right seat image 51 illustrates the position of the driver. The reference area image 40 is located between the right seat image SI and the left seat image 52 on the display screen. The right seat image 51 and the left seat image 52 are displayed on the display screen at an arrangement when the right seat and the left seat are viewed from the rear. The left and right seat images 51 and 52 and the fan icon 41 are displayed in a front-rear positional relationship in the y-axis direction so as to have depth on the display screen. In addition, by rotating the right seat a predetermined angle (for example, within a range of 10 to 45 degrees) counterclockwise around the z-axis from the front surface, and rotating the left seat by a predetermined angle (for example, within a range of 10 to 45 degrees) clockwise around the z-axis from the front surface, the left and right seat images 51 and 52 are displayed so that both seats face the fan icon 41 in front. That is, the reference area image 40 and the left and right seat images 51 and 52 are arranged so that the left and right seats face the reference area on the display screen. Thus, the passenger looking at the display screen can visually grasp from the display 10 that the left and right seats are facing the fan icon 41 in front.

The positional relationship between the reference area image 40 and the seat image 50 in the z-axis direction will be explained. The right seat image 51 and the left seat image 52 are displayed on the display screen at the same height in the z-axis direction. The fan icon 41 is displayed on the display screen so as to be at the same height in the z-axis direction as the chest portions of the left and right seat images 51 and 52. As will be described later, an image (icon) indicating the air of the air conditioner 20 is displayed between the reference area image 40 and the seat image 50. The reference area and the height of the seat image are defined so that the area between the fan icon 41 and the chest portion of the seat image 50 can be divided into an upper area and a lower area for this area on the display screen.

Next, the display of the air coming out from the air conditioner 20 will be explained. As illustrated in FIGS. 4 and 5, a right side air image 61 is displayed between the reference area image 40 and the right seat image 51, and a left side air image 62 is displayed between the reference area image 40 and the left seat image 52. The right side air image 61 is an image of the air blown from the air conditioner 20 toward the right seat, and the left side air image 62 is an image of the air blown from the air conditioner 20 toward the left seat. The right side air image 61 is displayed in touch areas 610 to 630, which will be described later, and the left side air image 62 is displayed in touch areas 640 to 660, which will be described later. The right side air image 61 and the left side air image 62 are not displayed in a case where the airflow level is "0", but are displayed when the airflow level is higher than "0". The right side air image 61 and the left side air image 62 indicate whether or not the air is blowing, and it becomes easier for the passenger to understand whether the air is blowing by checking whether the right side air image 61 and the left side air image 62 are displayed.

The reference area image 40 includes a "+" icon 42 and a "−" icon 43 in addition to the fan icon 41 described above. The "+" icon 42 is a button for increasing the airflow, and the "−" icon 43 is a button for decreasing the airflow. When the passenger touches the "+" icon 42 one time on the display screen, the airflow increases by one step, and when the passenger touches the "−" icon 43 one time, the airflow decreases by one step. The airflow level increases or decreases according to the number of touches. Furthermore, when the "+" icon 42 is touched with a long tap, the airflow level becomes the maximum value, and when the "−" icon 43 is touched with a long tap, the airflow level becomes zero or a minimum value (greater than 0).

An area between the reference area image 40 and the right seat image 51 is divided into a touch area 610 between the fan icon 41 and the chest portion of the right seat image 51, a touch area 620 between the "+" icon 42 and a head portion of the right seat image 51, and a touch area 630 between the "−" icon 43 and a lower portion (seat surface portion) of the right seat image 51. The touch area 610 is an area for controlling the air that comes out from the front air outlet toward the right seat, the touch area 620 is an area for controlling the defroster, and the touch area 630 is an area for controlling the air flowing out from the lower air outlet toward the lower portion of the right seat. That is, the control target of the air conditioner 20 changes depending on the position of the touch operation. For example, in a case where the passenger adjusts the airflow of the air coming out from the front air outlet toward the right seat, the passenger can touch the touch area 610. Note that the specific operating method for adjusting the airflow will be described later. An area between the reference area image 40 and the left seat image 52 is similarly divided into touch areas 640, 650, and 660. The touch area 640 is an area for controlling the air that comes out from the front air outlet toward the left seat, the touch area 650 is an area for controlling the defroster, and the touch area 660 is an area for controlling the air flowing out from the lower air outlet toward the lower portion of the left seat. On the display screen, the touch areas 610 and 640 are adjacent to the fan icon 41, the touch areas 620 and 650 are adjacent to the "+" icon 42, and the touch areas 630 and 660 are adjacent to the "−" icon 43.

An air icon 611 representing the air toward the front of the right seat, a defroster icon 621 representing the defroster, and an air icon 631 representing the air toward the lower portion of the right seat surface are displayed on the display screen of the display 10. On the display screen of the display 10, the air icon 611 is displayed between the fan icon 41 and the chest portion of the right seat image 51, the defroster icon 621 is displayed between the "+" icon 42 and the head portion of the right seat image 51, and the air icon 631 is displayed between the "−" icon 43 and the lower portion (seat surface portion) of the right seat image 51. The air icons 611 and 631 are represented by arrows, and the arrows point from the reference area image 40 to the right seat image 51.

An air icon 641 representing the air toward the front of the left seat, a defroster icon 651 representing the defroster, and an air icon 661 representing the air toward the lower portion of the left seat surface are displayed on the display screen of the display 10. On the display screen of the display 10, the air icon 641 is displayed between the fan icon 41 and the chest portion of the left seat image 52, the defroster icon 651 is displayed between the "+" icon 42 and the head portion of the left seat image 52, and the air icon 661 is displayed between the "−" icon 43 and the lower portion (seat surface portion) of the left seat image 52. The air icons 641 and 661 are represented by arrows, and the arrows point from the reference area image 40 to the left seat image 52.

The air icons 611, 631, 641, and 661 are displayed in the touch areas 610, 630, 640, and 660, respectively, to visually indicate to the passenger that the air coming out from the air outlet toward the front of the seat and the lower portion of the seat can be adjusted by touch operations on the touch areas 610, 630, 640, and 660. In addition, the defroster icons 621 and 651 are displayed in the touch areas 620 and 650, respectively, to visually indicate to the passenger that the defroster can be adjusted by a touch operation in the touch areas 620 and 650. Further, the directions of the air icons 611, 631, 641, and 661 indicate the operation direction of the directional touch operation when increasing the airflow.

Next, the operation method for adjusting the airflow and the display form of the airflow will be described. The touch areas 610 to 660 represent areas where touch operations for operating the air conditioner 20 are enabled independently for each area. In other words, the touch area 610 represents an area where a touch operation for adjusting the air coming out from the front air outlet to the right side passenger is enabled. The touch areas 620 and 650 represent areas where touch operations for controlling the defroster are enabled. The touch area 630 represents an area where a touch operation for adjusting the air coming out from the lower air outlet to the right side passenger is enabled. The touch areas 640 and 660, similar to the touch areas 610 and 630, represent areas that enable a touch operation for adjusting the air coming out from the air outlet to the left side passenger.

A desired control target may be selected from among the touch areas 610 to 660 by performing a touch operation on an area corresponding to the control target desired to be controlled. The control target corresponds to a device in the entire air conditioner 20 that outputs air. For example, in a case where the passenger wants to adjust the air coming out from the front air outlet toward the right seat, the passenger touches the touch area 610. Note that the touch operation for selecting the control target does not need to be a directional touch operation, and may be a touch operation that does not have directionality (a fixed direction (vector)), such as a tap. Depending on the direction of the directional touch operation within the touch area, it is possible to switch between a strong and weak airflow. In a case where the directional touch operation has a direction from the reference area image 40 toward the seat image 50, the airflow of the air coming out from the air conditioner 20 increases. On the other hand, in a case where the directional touch operation has a direction from the seat image 50 toward the reference area image 40, the airflow of the air coming out from the air conditioner 20 decreases. For example, in a case where the passenger on the right side wants to increase the airflow of the air coming out from the front air outlet, the passenger touches the inside of the touch area 610 and moves the finger in a direction from the fan icon 41 toward the right seat image 51 while touching the area. In addition, for example, in a case where the passenger on the left side wants to decrease the airflow of the air coming out from the lower air outlet, the passenger touches inside the touch area 660 and moves the finger in a direction from the left seat image 52 toward the "–" icon 43 while touching the area.

As described above, the control target of the air conditioner 20 is selected by touching one of the plurality of touch areas 610 to 660. Then, in a case where the touch operation has a direction from the reference area image 40 toward the seat image 50 on the display screen, the equipment control unit 32 outputs to the air conditioner 20 a control signal that increases the airflow of the air coming out from the air conditioner 20. In addition, when the touch operation has a direction from the seat image 50 to the reference area image 40 on the display screen, the equipment control unit 32 outputs a control signal to the air conditioner 20 to decrease the airflow of the air coming out from the air conditioner 20. In this way, the selection of the control target and the adjustment of the output from the control target are performed by touch operations, and the touch operations include the first gesture and the second gesture. Examples of the first gesture and the second gesture include a combination of a tap and a swipe, only a swipe or a flick, two swipes or two flicks, or a combination of a swipe and a flick. The first gesture indicates a finger movement that includes at least contact between the finger and the display screen. The second gesture indicates a finger movement in a certain direction. For example, in a touch operation that combines a tap and a swipe, the first tap corresponds to the first gesture, and the second swipe corresponds to the second gesture. That is, in a combination of two touch operations, the first gesture is an operation of touching one point on the display screen, such as touching or hovering. The second gesture is an operation such as a swipe or a flick that moves a point of contact with a finger on the display screen in a certain direction. In addition, as an example of a single touch operation, in a case of only a swipe or flick, the movement of touching the display screen with the finger for swiping or flicking corresponds to the first gesture, and the action of moving the finger after making contact with the finger (the action of sliding the finger for a swipe, the action of snapping the finger for a flick) corresponds to the second gesture. Moreover, another example of performing a touch operation twice is to swipe or flick twice each, or in the case of a combination of a swipe and flick, the first swipe or flick corresponds to the first gesture, and the second swipe or a flick corresponds to the second gesture. Note that the first and second gestures are not limited to a touch, swipe, and flick, and may be finger movements in other touch operations such as a long tap.

The display 10 detects a first gesture and a second gesture from touch operations in a plurality of touch areas 610 to 660. In a case where the display 10 detects the first gesture in the touch areas 610 to 660, the equipment control unit 32 selects the control target corresponding to the detected touch areas 610 to 660. For example, in a case where the display 10 detects the first gesture in the touch area 610, the equipment control unit 32 selects, from among the air conditioners 20, a device for blowing air out from the front air outlet to the right seat as a control target. In a case where the display 10 detects the second gesture in the touch areas 610 to 660, the equipment control unit 32 increases the control amount of the selected air conditioner 20 when the second gesture is in a direction away from the fan icon 41. On the other hand, in a case where the display 10 detects the second gesture in the touch areas 610 to 660 and when the second gesture has a direction approaching the fan icon 41, the equipment control unit 32 decreases the control amount of the selected air conditioner 20. The control amount is the airflow. This makes it possible to adjust the airflow with a touch operation. Note that the control amount is not limited to the airflow, and may be, for example, the air speed, temperature, or the like.

Furthermore, the equipment control unit 32 may adjust the increase or decrease of the air according to the operation amount and/or operation speed of the directional touch operation within the touch areas 610 to 660. That is, the equipment control unit 32 increases the increase or decrease of the air coming out from the air conditioner 20 the larger the operation amount of the directional touch operation (corresponding to the moving distance of the finger in contact with the swipe) becomes. In addition, the equipment control unit 32 increases the increase or decrease of the air coming out from the air conditioner 20 the larger the operation speed (corresponds to the moving speed of the touching finger in a swipe, or corresponds to the moving speed of the finger when flicking the finger) of the directional touch operation becomes.

Moreover, the equipment control unit 32 may select a control target in the equipment control unit 32 and/or adjust the increase or decrease of the air according to touch operations within the touch areas 610 to 660. For example, in a case where the touch area 610 of the touch areas 610 to 660 is touched with a finger, the equipment control unit 32 selects the air conditioner 20 of the portion that outputs air from the front air outlet toward the right seat as a control target, and controls the output of the air from the front air outlet toward the right seat. The equipment control unit 32 may increase the airflow level according to the number of touch operations. In a case where the touch operation is performed two times, the equipment control unit 32 may increase the airflow level by two levels. In this way, in a case where the touch areas 610 and 640 are touched, the equipment control unit 32 outputs a control command to control the output of the air coming out from the front air outlet, in a case where the touch areas 620 and 650 are touched, the equipment control unit 32 outputs a control command to control the defroster, and in a case where the touch areas 630 and 660 are touched, the equipment control unit 32 outputs a control command to control the output of the air from the lower air outlet.

The airflow of the air coming out from the defroster, the front air outlet, and the lower air outlet is indicated by a scale display in the touch areas 610 to 660. Touch areas 610 to 660 include scales representing the magnitude of airflow. The display screen in FIG. 3 illustrates a state in which each of the airflow from the defroster, the front air outlet, and the lower air outlet is zero. The display screen in FIG. 4 illustrates a state in which air at an airflow level of "3" is coming out from the front air outlet toward the right seat and the left seat, and no air is coming out from the defroster and the lower air outlet. The display screen in FIG. 5 illustrates a state in which air at an airflow level of "6" is coming out from the front air outlet toward the right seat and the left seat, and no air is coming out from the defroster and the lower air outlet.

On the display screen in FIG. 3, no air is coming out from the defroster, front air outlet, or lower air outlet, and the air images 61 and 62 are not displayed on the display screen. In the display screens of FIGS. 4 and 5, the air images 61 and 62 are displayed in the areas 610 and 640 because air is coming out from the front air outlet toward the left and right seats. In addition, in the display screens of FIGS. 4 and 5, no air is coming out from the defroster and the lower air outlet, and thus the air images 61 and 62 are not displayed in the areas 620, 630, 650, and 660. In this way, the air images 61 and 62 are displayed for each of the touch areas 610 and 640. This makes it easier to understand which air outlet the air is coming out from, which seat on the left or right the air is directed toward, and which air outlet the air is not coming out from. Note that the length and number of the air images 61 and 62 may be changed depending on the airflow level. For example, the larger the airflow level is, the longer the air images 61 and 62 may be. Furthermore, the higher the airflow level is, the more air images 61 and 62 may be displayed. In a case where the airflow level differs for each touch area 610 to 660, the length and number of air images 61 and 62 may differ for each area depending on the level. Note that the air images 61 and 62 may be displayed even in a case where there is no air coming out as in the example in FIG. 3.

Within the touch areas 610 to 660, six scales may be displayed to display seven airflow levels from "0" to "6". The six scales are expressed in a wave pattern extending from the reference area toward the left and right seats, and the number of displayed airflow images 610*a* represents the airflow level. In a case where the airflow level is zero, all of the airflow images 610*a* are displayed in white. In a case where the airflow level is greater than 0, the airflow image 610*a* is displayed in a color other than white depending on the size of the airflow level. The number of airflow images 610*a* represents the wave pattern and the airflow level, and one airflow image 610*a* represents one scale. In addition, the number of airflow images 610*a* can be changed for each touch area 610 to 660. Note that, in FIGS. 3 to 5, due to the color of the paper, the airflow image 610*a* is not displayed in white but has a dot pattern; however, the background of the display screen may be black and the airflow image 610*a* may be filled with white. Moreover, a pattern is formed by lining up a plurality of airflow images 610*a*. When the airflow level is zero, all of the airflow images 610*a* within the touch areas 610 to 660 are displayed in white. As illustrated in FIG. 4, in a case where air having an airflow level of "3" is coming out from the front air outlet toward the left and right seats, three airflow images 610*a* are displayed in a color other than white in the areas 610 and 640, thereby representing three patterns. In the areas 610 and 640, the airflow images 610*a* corresponding to the scale of airflow levels "4 to 6" remain displayed in white. In addition, as illustrated in FIG. 4, since no air is coming out from the defroster and the lower air outlet, all of the airflow images 610*a* in the touch areas 620, 630, 650, and 660 are displayed in white. In a case where the airflow level of the air coming out from the front air outlet toward the left and right seats is changed from 3 to 6, the display screen changes from the display form illustrated in FIG. 4 to the display form illustrated in FIG. 5, and the number of patterns displayed within the touch areas 610 and 640 increases from three to six. The display order of the plurality of airflow images 610*a* corresponds to the air direction, and the airflow images 610*a* are displayed from the side closest to the reference area. In other words, the display screen of the display 10 includes the airflow image 610*a* represented by a pattern between the reference area image 40 and the seat image 50, and the number of patterns displayed from the reference area image 40 toward the seat image 50 increases as the airflow increases. This makes it possible for the passenger to visually grasp the airflow level from the number of patterns and the length of the patterns. In this way, in the present embodiment, the airflow image 610*a* is displayed in white when no air is coming out from the air outlet, and, depending on the airflow level, the airflow image 610*a* is displayed in a color other than white when air is coming out from the air outlet. As a result, the scale can be seen, and thus it easier to understand whether or not air is blowing, and when air is blowing, the size of the airflow level. Note that the pattern formed in the airflow image 610*a* is not limited to a wave pattern, and may be another pattern such as a gradation pattern or a striped pattern.

In the present embodiment, an airflow image 610*a* is displayed for each of the touch areas 610 to 660, depending on the airflow level of the air coming out from each air outlet. That is, in the examples of FIGS. 4 and 5, in the touch areas 610 and 640, a number of scales corresponding to the airflow level are displayed in the airflow image 610*a* having a color other than white. Furthermore, in the touch areas 620, 630, 650, and 660, all scales in the airflow image 610*a* are white. Thus, the passenger is able to know from the display screen that air is coming out from the front air outlet toward the left and right seats, and is able to know the airflow level. In addition, the passenger is also able to know that no air is coming out from the defroster or the lower air outlet. In other words, it becomes easier for the passenger to know which air outlets the air is coming out from, whether the air is blowing toward, the left or right seat, and which air outlets the air is not coming out from. It also makes it easier to know the airflow level for each area.

Note that in the present embodiment, the display of the air images 61 and 62 and the airflow image 610*a* is controlled for each of the touch areas 610 to 660, but does not need to be controlled for each of the areas 610 to 660. For example, in a case where air having an airflow level of "3" is coming out from the front air outlet toward the right seat, but no air is coming out from the defroster or the lower air outlet, the air image 61 is displayed in the areas 610 to 630, and three airflow images 610*a* may be displayed in the areas 610 to 630 in a color other than white.

Note that the directional touch operation for adjusting the airflow may be performed at any position in the touch areas 610 to 660. In other words, in a case where the positional coordinates of the touch position when the display screen is touched move relatively within the touch areas 610 to 660, that is, in a case where the touch position can be confirmed at an arbitrary position within the touch areas 610 to 660, the directional touch operation is detected as an operation for adjusting the airflow. For example, in a case where the passenger on the right side wants to increase or decrease the airflow of the air coming out from the front air outlet, the passenger may touch a portion within the touch area 610 close to the fan icon 41 or a portion close to the right seat image 51. Then, the passenger only has to change the operating direction of the directional touch operation according to the increase or decrease in the airflow. In addition, the passenger may change the operation amount and/or operation speed of the directional touch operation depending on the increase or decrease of the air. This makes it possible for the passenger to touch any portion of the touch areas 610 to 660 in order to adjust the airflow.

Moreover, adjustment of the airflow by the directional touch operation may be changed depending on the position of the touch within the touch areas 610 to 660. In other words, in a case where a directional touch operation is performed within the touch areas 610 to 660, the airflow increases or decreases up to the scale matching the position of the end point of the touch operation. For example, in the example of FIG. 4, in a case where the passenger performs a directional touch operation within the touch area 610 and the touch position moves from the first scale to the third scale, the equipment control unit 32 sets the airflow level of the air from the front air outlet to 3. Thus, the airflow level can be changed according to the touch position in the touch areas 610 to 660.

Next, the synchronization switch button 70 will be described. The synchronization switch button 70 is a switch for synchronously adjusting the right seat airflow from the air conditioner 20 toward the right seat and the left seat air flowing from the air conditioner 20 toward the left seat. In a case where the synchronization switch button 70 is ON, the passenger can adjust the air output for both the right seat air and the left seat air by touching the touch areas 610 to 660. In a case where the synchronization switch button 70 is OFF, the passenger is not able to adjust the air output for both the right seat air and the left seat air even when the touch areas 610 to 660 are touched, and is able to adjust the air output corresponding to the touched area. For example, in a case where a directional touch operation is performed from the reference area image 40 toward the right seat image 51 within the touch area 610 while the synchronization switch button 70 is ON, in addition to the air that is output from the front air outlet toward the right seat, the air that comes out from the front air outlet toward the left seat is adjusted according to the directional touch operation. The air direction and airflow level are also adjusted synchronously for the left and right air. Further, for example, in a case where the passenger touches the touch area 660 while air is not being output from the lower air outlet toward the left and right seats and the synchronization switch button 70 is ON, the air coming out from the lower air outlet toward the left seat and the air coming out from the front air outlet toward the left seat may be output in synchronization. That is, in a case where the synchronization switch button 70 is ON, the equipment control unit 32 outputs a control command to the air conditioner 20 to control the output of both the right seat air and the left seat air in response to a touch operation. Furthermore, in a case where the synchronization switch button 70 is OFF, the equipment control unit 32 outputs a control command to the air conditioner 20 to control the output of either the right seat air or the left seat air in response to a touch operation. Thus, the passenger is able to adjust the air from the air conditioner 20 toward both the left and right seats by touching either the left or right area with respect to the reference area on the display screen. Note that in the present embodiment, although the airflow of the air flowing toward the left and right seats is synchronously controlled in accordance with the ON/OFF switching of the synchronization switch button 70, control is not limited to the airflow, but the direction and temperature of the air may also be synchronously controlled. In other words, in a case where the synchronization switch button 70 is ON, the equipment control unit 32 issues a control command to the air conditioner 20 to synchronously control the airflow of the air of both the right seat air and the left seat air in response to a touch operation, or outputs a control command to the air conditioner 20 to synchronously control the air temperature of both the right seat air and the left seat air.

Next, images around the fan icon 41 and animation of the fan icon 41 will be described. The reference area image 40 includes, around the fan icon 41, a plurality of scales 44 surrounding the fan icon 41. The plurality of scales 44 are arranged in a ring shape around the fan icon 41, and gaps are provided between the plurality of scales 44 to distinguish the scales. As the airflow level increases, the number of displayed scales 44 increases in the clockwise direction. In the example in FIG. 4, the airflow level is 3, and thus three scales 44 are displayed. In the example in FIG. 5, the airflow level is 6, and thus six scales 44 are displayed. In other words, the plurality scales 44 increase or decrease depending on the airflow of the air flowing toward the left and right seats. Moreover, the fan icon 41 may have an animation function that rotates according to the air speed and/or airflow coming out from the front air outlet and/or the lower air outlet. In a case where air is not coming out from the front air outlet and the lower air outlet, the fan icon 41 remains stationary. In a case where air comes out from the front air outlet and the lower air outlet, the fan icon 41 rotates. The rotational speed of the fan icon 41 increases as the airflow level and/or air speed increases. Note that the air speed corresponds to the airflow level. Note that regarding the display of a plurality of scales 44, in a case where the airflow of the air flowing toward the left seat and the airflow of the air flowing toward the right seat are different, the number of scales 44 displayed may correspond to a larger airflow, a smaller airflow, or an average airflow.

Next, the temperature adjustment bars 81 and 82 will be described. As illustrated in FIGS. 3 to 5, the temperature adjustment bar 81 is displayed on the right side of the right seat image 51, and the temperature adjustment bar 82 is displayed on the left side of the left seat image 52. The temperature adjustment bars 81 and 82 have images 81*a* and 82*a* of line segments along the z-axis, and buttons 81*b* and 82*b* that can be moved on the line segments. The upper ends of the line segment images 81*a* and 82*a* are displayed in red, and the lower ends of the line segment images 81*a* and 82*a* are displayed in blue. Note that in FIGS. 3 to 5, dots are used instead of colors, and similarly in other FIGS. 6 to 8, dots are used instead of colors. In addition, the line segment images 81*a* and 82*a* are displayed in a gradation that changes from red to blue from the top end to the bottom end. The buttons 81*b* and 82*b* on the line segments can be moved by touch operations such as a tap, a swipe, and/or a flick. In a case where the buttons 81*b* and 82*b* are moved toward the upper end of the line segment by a touch operation, the temperature setting of the air conditioner 20 becomes higher. On the other hand, in a case where the buttons 81*b* and 82*b* are moved toward the lower end of the line segment by a touch operation, the temperature setting of the air conditioner 20 becomes lower. The temperature setting of the air conditioner 20 changes depending on the position of the buttons 81*b* and 82*b* included in the temperature adjustment bars 81 and 82. The temperature adjustment bar 81 is an adjustment icon for adjusting the temperature setting in the space of the right seat. The temperature adjustment bar 82 is an adjustment icon for adjusting the temperature setting in the left seat space. The temperature adjustment bars 81 and 82 can be operated by an upward touch operation and a downward touch operation. In other words, in a case where the temperature adjustment bars 81 and 82 are operated by an upward touch operation, the equipment control unit 32 outputs a control command to raise the temperature setting of the air conditioner 20, and in a case where the temperature adjustment bars 81 and 82 are operated by a downward touch operation, the equipment control unit 32 outputs a control command to lower the temperature setting of the air conditioner 20. Thus, the passenger is able to easily change the temperature setting of the air conditioner 20 by a touch operation on the display 10. Moreover, the ends of the temperature adjustment bars 81 and 82 are distinguished by red and blue, and thus the passenger is able to easily know from the display screen which direction to perform a touch operation in order to raise or lower the temperature.

Furthermore, in a case where the buttons 81*b* and 82*b* included in the temperature adjustment bars 81 and 82 are operated by a directional touch operation, the unit of change in the temperature setting may be changed depending on the operation speed of the directional touch operation. The unit of change in the temperature setting is preset in multiple stages, and is preset to, for example, 0.5° C. and 1.0° C. Then, in a case where the movement speed of the buttons 81*b* and 82*b* is equal to or less than a predetermined speed threshold, the equipment control unit 32 sets the unit of change in the temperature setting (amount of temperature change per unit) to the minimum unit (0.5° C.). In a case where the movement speed of the buttons 81*b* and 82*b* is higher than a predetermined speed threshold, the equipment control unit 32 sets the unit of change in the temperature setting (amount of temperature change per unit) to a unit larger than the minimum unit (for example, 1.0° C.). For example, in a case where a passenger operates the buttons 81*b* and 82*b* by swiping, when the movement speed of the buttons 81*b* and 82*b* by swiping is high, the amount of change in the temperature setting will be large compared to the amount of movement of the buttons 81*b* and 82*b* by swiping. On the other hand, when the movement speed of the buttons 81*b* and 82*b* is low in the touch operation by the same swipe, the amount of change in the temperature setting becomes small even when the amount of button movement by the swipe is the same. That is, even when the amount of movement of the buttons 81*b* and 82*b* is the same, the amount of change in the temperature setting changes due to the difference in movement speed. The higher the movement speed of the touch operation, the larger the unit of change in the temperature setting becomes, and therefore the range of change in the temperature setting also becomes larger. Therefore, the unit of change in the temperature setting can be adjusted by the movement speed of the buttons 81*b* and 82*b* by directional touch operation, and thus the temperature can be easily adjusted.

Next, the temperature display images 91 and 92 will be described. As illustrated in FIGS. 3 to 5, the temperature display image 91 is displayed on the right side of the right temperature adjustment bar 81, and the temperature display image 92 is displayed on the left side of the left temperature adjustment bar 82. The temperature display images 91 and 92 have temperature meters 91*a* and 92*a*, up buttons 91*b* and 92*b*, and down buttons 91*c* and 92*c*. The temperature meters 91*a* and 92*a* indicate the current temperature setting. The up buttons 91*b* and 92*b* are buttons for increasing the temperature setting, and the down buttons 91*c* and 92*c* are buttons for decreasing the temperature setting. When the up buttons 91*b* and 92*b* are touched one time, the temperature setting increases by a predetermined change unit (for example, 0.5° C.). In addition, when the down buttons 91*c* and 92*c* are touched one time, the temperature setting is decreased by a predetermined change unit (for example, 0.5° C.). Moreover, the up buttons 91*b* and 92*b* are displayed in red, and the down buttons 91*c* and 92*c* are displayed in blue. Thus, the passenger is able to check the current temperature setting and easily change the temperature setting of the air conditioner 20 by a touch operation on the display 10. Furthermore, the up buttons 91*b* and 92*b* and down buttons 91*c* and 92*c* are distinguished by red and blue, and thus the passenger is able to easily know from the display screen which button to touch to raise or lower the temperature.

Figure 6:
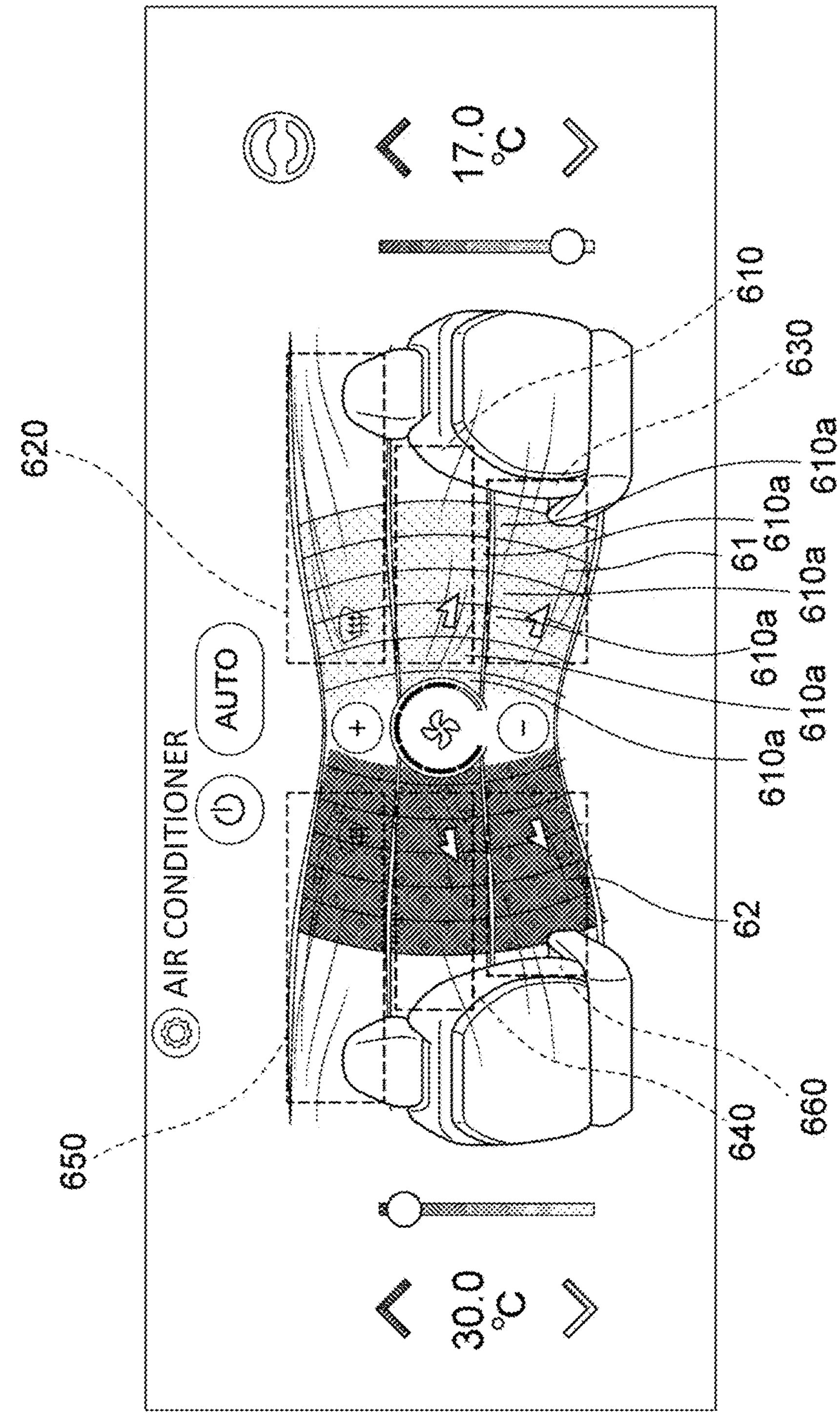
FIG. 6 is a diagram illustrating a display screen of the display in FIG. 1.

Next, the colors of the wave patterns displayed in the touch areas 610 to 660 will be described with reference to FIGS. 6 and 7. The temperature setting of the air conditioner 20 can be set to different temperatures for the right seat and the left seat. For example, in the example illustrated in FIG. 6, air is coming out from the defroster, the front air outlet, and the lower air outlet toward the right seat, the airflow level is set to "6," and the temperature setting is set to 17.0° C. In addition, air is coming out from the defroster, the front air outlet, and the lower air outlet toward the left seat, the airflow level is set to "6." and the temperature setting is set to 30.0° C. In this case, on the display screen of the display 10, between the reference area image and the right seat image, the airflow image 610*a* is displayed in a color representing the temperature setting of 17.0 degrees. Moreover, between the reference area image and the left seat image, the airflow image 610*a* is displayed in a color representing the set temperature of 30.0 degrees. As a result, six wave patterns are displayed to indicate the airflow level "6", and the wave pattern is colored in accordance with the temperature setting. Note that in a case where the airflow level is "3", the airflow image 610*a* is displayed in a color according to the temperature setting on three of the six scales, and in white on the other three scales. This makes it possible to recognize the scale, making it easier to know the strength of the airflow.

Figure 7:
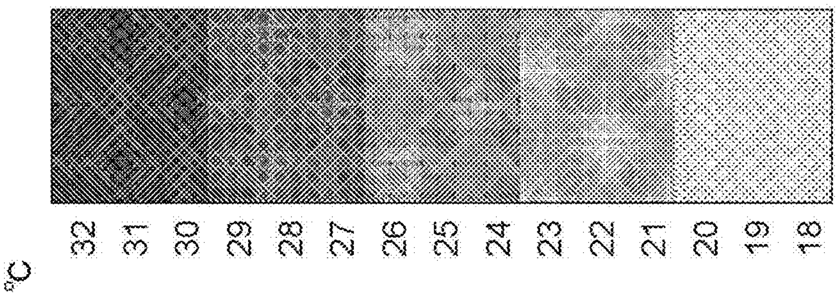
FIG. 7 is a graph illustrating a relationship between the temperature display and temperature setting.

FIG. 7 is a bar graph showing the relationship between the colors displayed in the wave pattern and the temperature, and as shown in the graph in FIG. 7, red is displayed when the temperature setting is high, and blue is displayed when the temperature setting is low. Furthermore, as the temperature setting becomes lower, the color display changes from red to white and from white to blue. In the example in FIG. 7, in a case where the temperature setting is less than 20.5° C., the color display will be blue, in a case where the temperature setting is 20.5° C. or more and less than 23.5°

C., the color display will be light blue, in a case where the temperature setting is 23.5° C. or more and less than 26.5° C., the color display will be white, in a case where the temperature setting is 26.5° C. or more and less than 29.5° C., the color display will be pink, and in a case where the temperature setting is 29.5° C. or more, the color display will be red. In the example in FIG. 6, the temperature setting of the air conditioner 20 for blowing air to the right seat is set to 17° C. Therefore, the wave patterns displayed in the touch areas 610 and 630 are displayed in blue. In addition, the temperature setting of the air conditioner 20 for blowing air to the left seat is set to 30° C., and the wave patterns displayed in the touch areas 640 and 660 are displayed in red. In this way, the display screen of the display 10 includes a color image (corresponding to the wave pattern image in FIG. 6) representing the magnitude of the temperature setting of the air conditioner 20 in color, and in a case where the temperature setting is equal to or higher than a predetermined temperature threshold, the color of the color image becomes red, and when the temperature setting is less than the temperature threshold, the color of the color image becomes blue. Thus, it is possible to know the temperature setting of the air conditioner 20 from the color. Note that the color display according to the temperature setting is not limited to the wave patterns within the touch areas 610 to 660, and may be applied to, for example, the numbers on the temperature meters 91*a* and 92*a*. Furthermore, in the example in FIG. 6, the color indicating the temperature setting may be displayed attached to the air images 61 and 62 instead of the wave patterns.

As described above, in the control system according to the present embodiment, the display 10 displays a display screen including a fan icon 41 and touch areas 610 to 660 that enable touch operations for operating the air conditioner 20, and detects, from a touch operation, a second gesture that is different from the first gesture and has a fixed direction. In a case where the display 10 detects the first gesture in a touch areas 610 to 660, the controller 30 executes selection of the air conditioner 20: in a case where the display 10 detects the second gesture in a touch areas 610 to 660 and the second gesture has a direction away from the fan icon 41, the controller 30 increases the control amount of the air conditioner 20; and in a case where the display 10 detects the second gesture in a touch areas 610 to 660 and the second gesture has a direction approaching the fan icon 41, the controller 30 decreases the amount of control of the air conditioner 20. Thus, touch operations that follow the airflow or touch operations that go against the airflow are possible, and the user can intuitively operate the air conditioner 20. As a result, it is possible to improve the operability when operating the air conditioner 20 by touch operations on the display screen.

In addition, in the present embodiment, the seats represented by the right seat image 51 and the left seat image 52 face the fan icon 41 on the display screen. Thus, the passenger is able to know from the display screen the relationship between the positions of the seats arranged in the vehicle interior and the controlled air. As a result, the user can intuitively operate the air conditioner 20.

Moreover, in the present embodiment, the controller 30 outputs a control command that causes the display 10 to display an image indicating the control amount (airflow). Thus, the current airflow can be confirmed on the display screen of the display 10.

Note that, in the present embodiment, the display screen displays two seat images and the control method and operation method for controlling the air toward the two seats have been described; however, it is also possible for the display screen of the display 10 to display one seat image and to control the air toward one seat in response to a touch operation on the display 10. For example, the controller 30 causes the display 10 for the right seat to display an image including the reference area image 40 and corresponding to the right half of the display screens of FIGS. 3 to 5, and causes the left seat display 10 to display an image including the reference area image 40 and corresponding to the left half of the display screens of FIGS. 3 to 5. The controller 30 then controls the air flowing out from the air conditioner to the right seat in response to a touch operation on the display 10 for the right seat. In addition, the controller 30 controls the air flowing out from the air conditioner 20 to the left seat in response to a touch operation on the display 10 for the left seat. Note that the above-mentioned method may be applied as appropriate to the operation method for operating the display screen and the control method for controlling the air conditioner 20 Thus, touch operations that follow the airflow or touch operations that go against the airflow are possible, and the user can intuitively operate the air conditioner 20. As a result, it is possible to improve the operability when operating the air conditioner 20 by touch operation on the display screen. Furthermore, in the present embodiment, three or more seat images may be displayed on the display screen of the display 10, and the air toward each seat may be controlled in response to a touch operation on the display 10.

Note that in the present embodiment, in a case where the display 10 detects the first gesture in a touch areas 610 to 660, the equipment control unit 32 may control the direction of the air conditioner 20 so that the air coming out from the air conditioner 20 is oriented toward the detected touch area 610 to 660. In a case where the display 10 detects the second gesture in a touch area 610 to 660, the equipment control unit 32 may control the increase or decrease of the airflow depending on the direction of the second gesture. Thus, touch operations for controlling the air direction and adjusting the airflow become possible, and the user can intuitively operate the air conditioner 20. As a result, it is possible to improve the operability when operating the air conditioner 20 by touch operations on the display screen. Note that in a case where the display 10 detects the first gesture in a touch area, the controller 30 may execute both selection of the air conditioner 20 and control of the direction of the air conditioner 20.

It should be noted that the touch areas 610 to 660 in the present embodiment correspond to the "effective area" of the present invention.

Second Embodiment

Figure 8:
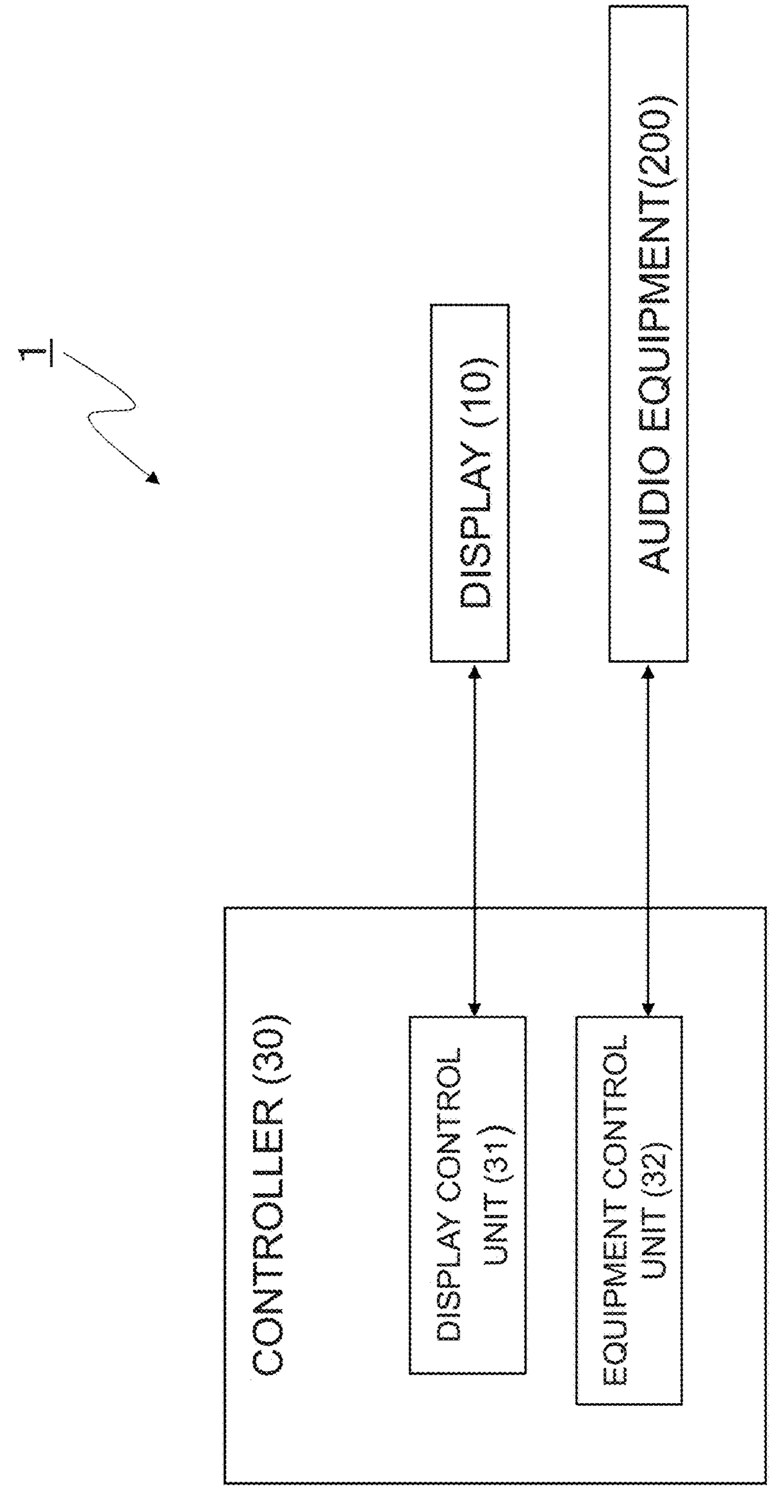
FIG. 8 is a diagram illustrating a display screen of a display in an control system according to a modification of the present embodiment.
Figure 9:
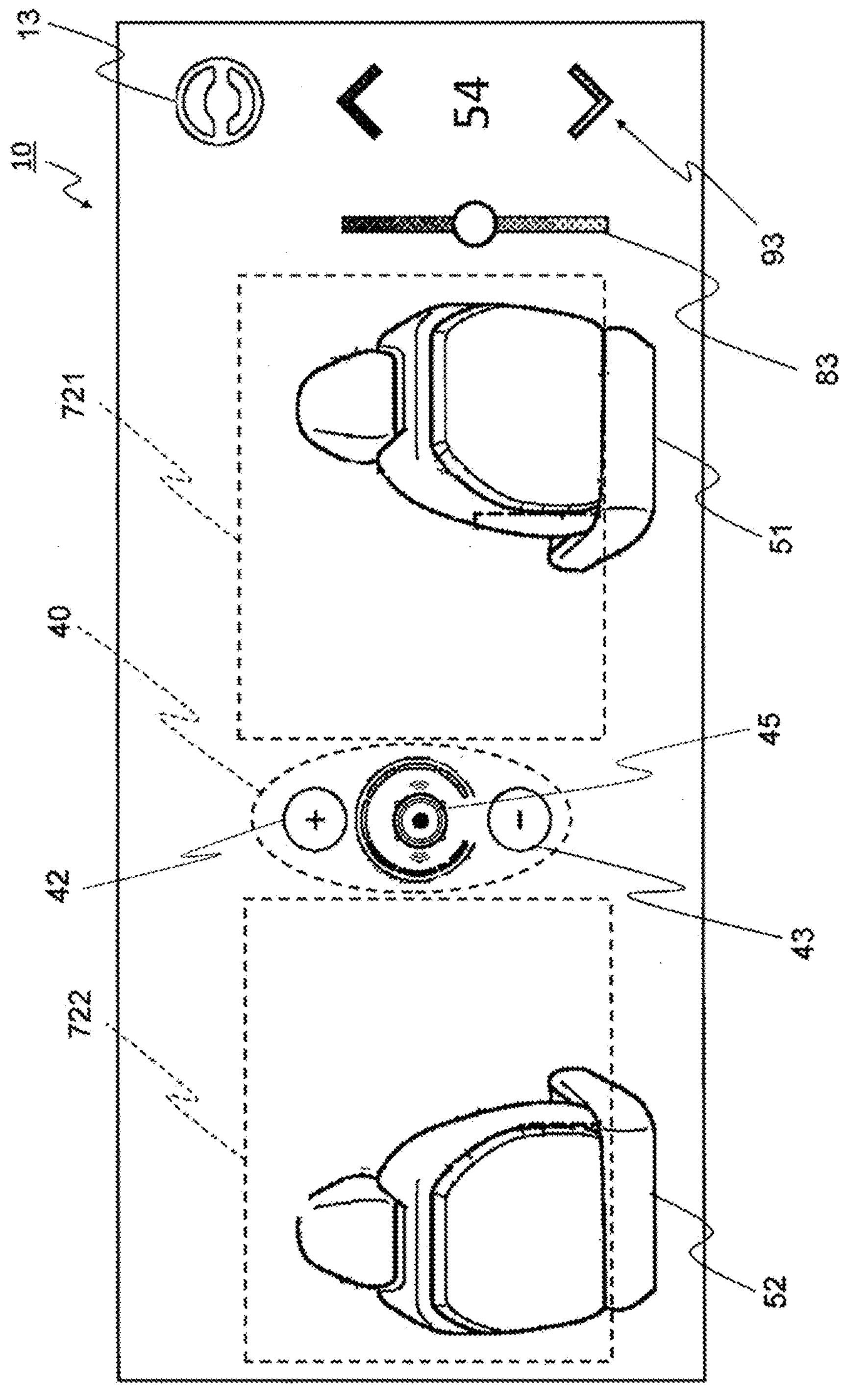
FIG. 9 is a diagram illustrating a display screen of the display in FIG. 8.

Next, a second embodiment of the present invention will be described. FIG. 8 is a block diagram illustrating a control system according to the second embodiment. FIG. 9 illustrates a display screen of the display 10, which is an operation screen for controlling audio equipment 200. The present embodiment is different from the first embodiment in that the control target is audio equipment, and a portion of the display screen of the display 10 and a portion of the equipment control unit 32 are different from the first embodiment. Other configurations are the same as those in the first embodiment. Hereinafter, the display control unit 31 and the equipment control unit 32 in the second embodiment will be explained, and the same reference numerals will be given to parts having the same configuration as in the first embodiment, and descriptions thereof will be omitted. In addition, a description of portions similar to the control process by the controller 30 in the first embodiment will be omitted. The description of the first embodiment is appropriately incorporated into the second embodiment.

The audio equipment 200 is equipment that reproduces sound and outputs the sound inside the vehicle, and is audio equipment. The audio equipment 200 is composed of an audio system, and includes speakers and the like that output sound into the seat space of the passenger. The speakers are provided on the dashboard, doors, or the like.

The equipment control unit 32 controls the audio equipment 200 based on touch operations. The equipment control unit 32 identifies a control item from content of the touch operation, and depending on the identified control item, performs control of turning ON/OFF the system, selecting a speaker to output sound from, sound location of the sound, volume of the sound, and the like. Note that the sound location indicates a location (listening point) where sound output from the speaker is heard, and by changing the sound output timing of each speaker installed in the vehicle interior, it is possible, for example, to set the sound location above the right seat, and create an environment where the right seat passenger can easily hear the sound. Note that setting the sound location is equivalent to controlling the output direction of the sound. The equipment control unit 32 outputs a control command according to the control item to the audio equipment 200. The control items are determined in advance according to specifications of the audio equipment 200, such as sound location setting, volume setting, and speaker selection. Control items are selected by touch operations on the display 10 or by switches provided in the vehicle. In addition, the equipment control unit 32 manages the operating state of the audio equipment 200 and the sound environment inside the vehicle.

Next, with reference to FIG. 9, a control method for controlling the audio equipment 200 using the display 10, and a display screen of the display 10 will be described. As illustrated in FIG. 9, the display screen of the display 10 includes a steering wheel icon 13, a reference area image 40, a seat image 50, a volume adjustment bar 83, and a volume display image 93.

The reference area image 40 is an image within a predetermined range with a center point of the display screen as a center of the area, and includes at least a speaker icon 45. The speaker icon 45 is represented by a figure resembling a speaker in the center of the display screen. In other words, the speaker icon 45 is an icon that resembles the audio equipment 200 that is the control target. The display screen of the display 10 includes a reference area image 40 representing a reference area and seat images 51, 52 representing seats. The reference area image 40 does not necessarily need to be an image that allows the passenger to recognize the boundaries of the reference area, and may include at least the speaker icon 45. The reference area image 40 includes a "+" icon 42 and a "−" icon 43 in addition to the speaker icon 45. The "+" icon 42 is a button for increasing the volume, and the "−" icon 43 is a button for decreasing the volume.

The area between the reference area image 40 and the right seat image 51 is divided into a touch area 721 between the speaker icon 45 and the right seat image 51 and a touch area 722 between the speaker icon 45 and the left seat image 52. The touch area 721 is an area for arranging the sound location on the right seat side and for controlling the volume output to the right seat, and the touch area 722 is an area for arranging the sound location on the left seat side and for controlling the volume output to the left seat. That is, the control target of the audio equipment 200 changes depending on the position of the touch operation. For example, in a case where the passenger wants to set the sound location for the right seat, the passenger can touch the touch area 611. The touch areas 721, 722 are adjacent to the speaker icon 45 on the display screen.

Next, the operation method for setting the sound location and adjusting the volume will be described. The touch areas 721, 722 represent areas where touch operations for operating the audio equipment 200 are enabled independently for each area. By performing a touch operation in the area of the touch areas 721, 722 in which the sound location is desired to be set, the control target can be selected. For example, in a case where the passenger wants to set the sound location for the right seat, the passenger touches the touch area 721. Note that the touch operation for setting the sound location need not be a directional touch operation, and may be a non-directional touch operation such as a tap. The volume can also be increased or decreased depending on the direction of the directional touch operation within the touch area. In a case where the directional touch operation is in a direction from the reference area image 40 toward the seat image 50, the volume increases. On the other hand, in a case where the directional touch operation is in a direction from the seat image 50 toward the reference area image 40, the volume decreases.

The display 10 detects a first gesture and a second gesture from touch operations in the plurality of touch areas 611, 612. In a case where the display 10 detects the first gesture in a touch area 721, 722, the equipment control unit 32 selects the control target corresponding to the detected touch area 721, 722. For example, in a case where the display 10 detects the first gesture in the touch area 721, the equipment control unit 32 sets the sound location to the detected location within the touch area 721 where the first gesture is detected, and selects audio equipment 200 as a control target. The equipment control unit 32 sets the sound location at a location within the vehicle interior space that corresponds to the detected location on the display screen where the first gesture was detected. In a case where the display 10 detects the second gesture in a touch area 721, 722, the equipment control unit 32 increases the volume when the second gesture is away from the speaker icon 45. On the other hand, in a case where the display 10 detects the second gesture in a touch area 721, 722 and the second gesture is in a direction approaching the speaker icon 45, the equipment control unit 32 decreases the volume. Note that the volume can be increased or decreased by adjusting the amplitude output from the speaker, where the increase or decrease in the amplitude is a control amount that corresponds to the increase or decrease in the volume. Thus, it is possible to adjust the volume by a touch operation.

As illustrated in FIG. 9, a volume adjustment bar 83 is displayed on the right side of the right seat image 51, and a volume display image 93 is displayed on the right side of the volume adjustment bar 83. The volume adjustment bar 83 and the volume display image 93 are icons for adjusting the volume and displaying the current volume. The volume adjustment method and volume display form in the volume adjustment bar 83 and volume display image 93 are the same as those in the first embodiment in which "temperature" in the temperature adjustment bar 81 and temperature display image 91 is replaced with "volume". However, in this second embodiment, one each of the volume adjustment bar 83 and the volume display image 93 are displayed on the display screen of the display 10, making it possible to operate and display the volume of the entire vehicle interior. Note that in a case where the volume can be adjusted for each seat, two volume adjustment bars 83 and two volume display images 93 may be displayed on the display screen, similarly to the first embodiment.

As described above, in the control system according to the present embodiment, the display 10 displays a display screen that includes the speaker icon 45 and the touch areas 721, 722 that enable touch operations for operating the audio equipment 200, and from a touch operation, detects a first gesture and a second gesture that is different from the first gesture and has a fixed direction. In a case where the display 10 detects the first gesture in a touch area 721, 722, the controller 30 selects the audio equipment 200; in a case where the display 10 detects the second gesture in a touch area 721, 722 and the second gesture has a direction away from the speaker icon 45, the controller 30 increases the amount of control of the audio equipment 200; and in a case where the display 10 detects a second gesture in a touch area 721, 722 and the second gesture has a direction approaching the speaker icon 45, the controller 30 decreases the amount of control of the audio equipment 200. This makes it possible to use touch operations to control the sound location and adjust the volume, and the user is able intuitively operate the audio equipment 200. As a result, it is possible to improve the operability when operating the audio equipment 200 by touch operations on the display screen.

Note that in the present embodiment, the sound location may be adjusted using the second gesture. For example, in a case where the display 10 detects a second gesture in a touch area 721, 722 and the second gesture has a direction away from the speaker icon 45, the sound location may be controlled to move away from the speaker, and when the second gesture has a direction that approaches the speaker icon 45, the sound location may be controlled to approach the speaker.

Note that the images, icons, and the like included in the display screen described in the first embodiment may be displayed on the display screen in the present embodiment, and the touch operations on the display screen described in the first embodiment may be applied to the present embodiment. For example, the wave pattern in the first embodiment may be displayed on the display screen to represent the loudness of the sound.

Note that the touch areas 721, 722 in the present embodiment correspond to the "effective area" of the present invention.

Third Embodiment

Figure 10:
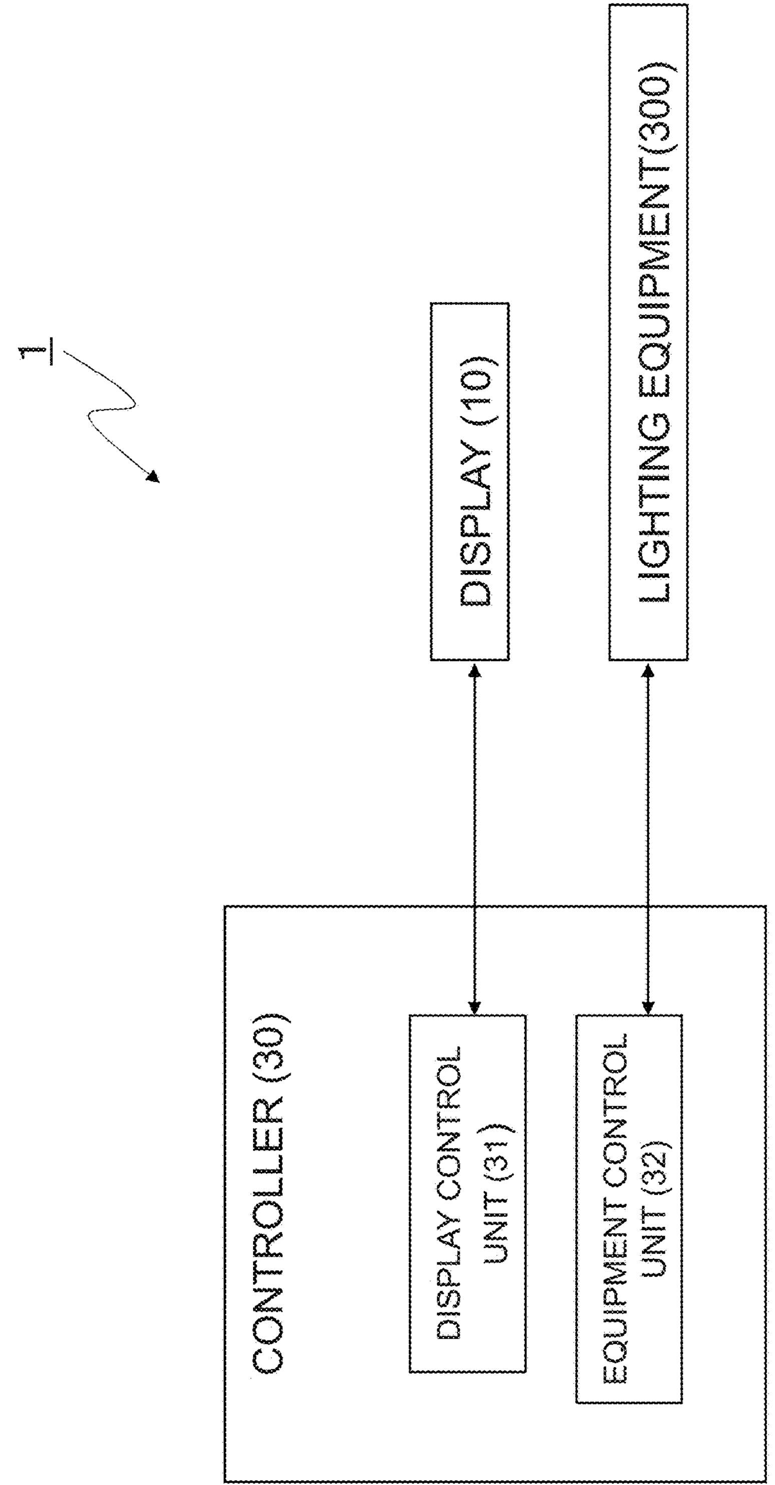
FIG. 10 is a block diagram illustrating a control system according to an embodiment of the present invention.
Figure 11:
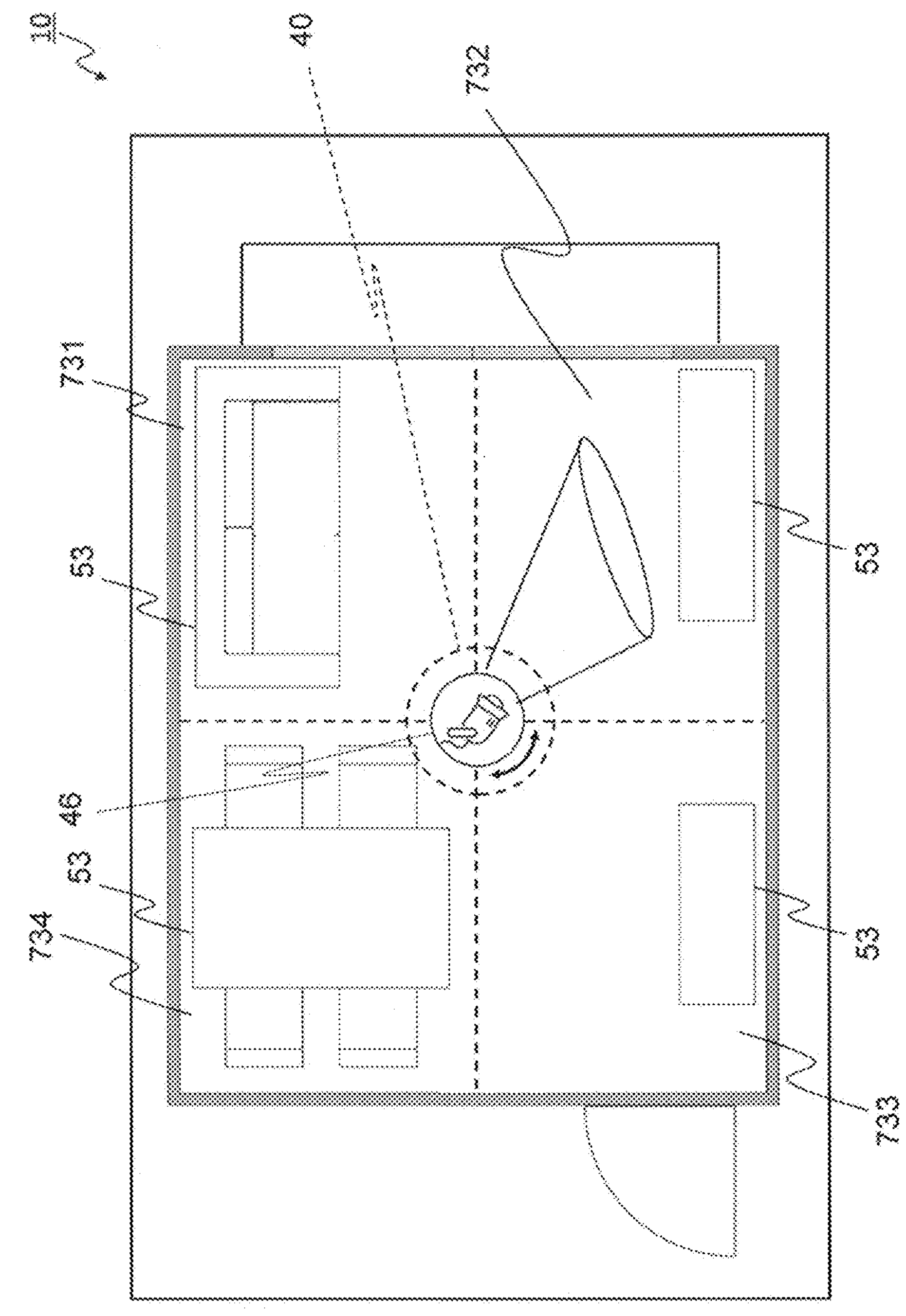
FIG. 11 is a diagram illustrating a display screen of the display in FIG. 10.

Next, a third embodiment of the present invention will be described. FIG. 10 is a block diagram illustrating a control system according to the third embodiment. FIG. 11 illustrates a display screen of the display 10, which is an operation screen for controlling lighting equipment 300. The present embodiment is different from the first embodiment in that the control target is lighting equipment, and a part of the display screen of the display 10 and the equipment control unit 32 are different from the first embodiment. Other configurations are the same as those in the first embodiment. Hereinafter, the display control unit 31 and the equipment control unit 32 in the third embodiment will be explained, and the same reference numerals will be given to parts having the same configuration as in the first embodiment, and descriptions thereof will be omitted. In addition, a description of portions similar to the control process by the controller 30 in the first embodiment will be omitted. The descriptions of the first and second embodiments are appropriately incorporated into the third embodiment.

The display 10 is electronic equipment or the like that can be carried by a user. While carrying a terminal equipped with the display 10, the user touches the display screen of the display 10 to operate the illuminated area, illuminance, and the like of the lighting equipment 300. The lighting equipment 300 is installed on the ceiling of a room and can shine light onto a part of the room. The location and illuminance of the illuminated area are adjusted under the control of the controller 30.

The equipment control unit 32 controls the lighting equipment 300 based on touch operations. The equipment control unit 32 specifies a control item from the content of the touch operation, and controls turning ON/OFF of the lighting, the illuminated area of the lighting, the illuminance of the lighting, and the like according to the specified control item. The equipment control unit 32 outputs a control command according to the control item to the lighting equipment 300. The control items are determined in advance according to the specifications of the lighting equipment 300, such as a location setting, an illuminance setting, and the like of the lighting area. A control item is selected by a touch operation on the display 10. In addition, the equipment control unit 32 manages the operating state of the lighting equipment 300 and the indoor lighting environment.

Next, with reference to FIG. 11, a control method for controlling the lighting equipment 300 using the display 10, and the display screen of the display 10 will be described. As illustrated in FIG. 11, the display screen of the display 10 includes a light icon 46, a reference area image 40, and furniture images 53. The display screen illustrated in FIG. 11 displays an entire image of a room in which the lighting equipment 300 is installed.

The reference area image 40 is an image within a predetermined range with the center point of the display screen as the center of the area, and includes at least a light icon 46. The light icon 46 is represented by a figure resembling a light at the center of the display screen. In other words, the light icon 46 is an icon that resembles the lighting equipment 300 that is the control target. The display screen of the display 10 includes a reference area image 40 representing a reference area and furniture images 53 representing furniture such as a sofa. The reference area image does not necessarily need to be an image that allows the user to recognize the boundaries of the reference area. Note that in the present embodiment, the light icon 46 is located at the center point of the display screen because the lighting equipment 300 is provided in the center of the room; however, the display position of the light icon 46 is changed as appropriate depending on the installation position of the lighting equipment 300.

The display screen is divided into four areas, touch areas 731 to 734, depending on the position of the furniture represented by the furniture images 53. Touch area 731 includes an image of a sofa and is located at the upper right on the display screen in FIG. 11. On the display screen in FIG. 11, touch area 732 is located at the lower right, touch area 733 is located at the lower left, and touch area 734 is located at the upper left. The touch areas 631 to 624 may be displayed as images on the display screen so that the boundaries of the areas can be seen, or they may not be so displayed. In addition, the number of touch areas does not need to be four, and may be two, three, or five or more. Moreover, the entire display screen may be used as a touch area without necessarily being divided into sections.

Next, the position of the illuminated area and the operation method for adjusting the illuminance will be described. The touch areas 731 to 734 represent areas where touch operations for operating the lighting equipment 300 are enabled independently for each area. The irradiation direction can be selected by performing a touch operation on a portion of a touch area 731 to 734 where the illuminated area is desired to be set. For example, in a case where the user wants to illuminate the sofa, the user touches the touch area 731. Note that the touch operation for setting the location of the illuminated area does not need to be a directional touch operation, and may be a non-directional touch operation such as a tap. Moreover, the illuminance can be increased or decreased depending on the direction of the directional touch operation within the touch area.

The display 10 detects the first gesture and the second gesture from touch operations in the plurality of touch areas 731 to 734. In a case where the display 10 detects the first gesture in a touch area 731 to 734, the equipment control unit 32 adjusts the direction of the lighting equipment 300 so that the illuminated area faces the location corresponding to the detected touch area 731 to 734. For example, in a case where the display 10 detects the first gesture in the touch area 731, the equipment control unit 32 executes control of the adjustment of the lighting equipment 300 so that light hits the detected location in the touch area 731 to 734 where the first gesture is detected. In a case where the display 10 detects the second gesture in a touch area 731 to 734 and the second gesture has a direction away from the light icon 46, the equipment control unit 32 increases the illuminance. On the other hand, in a case where the display 10 detects the second gesture in a touch area 731 to 734 and the second gesture has a direction approaching the light icon 46, the equipment control unit 32 decreases the illuminance. Note that the illuminance can be increased or decreased by adjusting the amount of light output from the light, and the increase or decrease in the amount of light, which is a control amount, corresponds to the increase or decrease in the illuminance. Thus it is possible to adjust the illuminance by touch operations.

As described above, in the control system according to the present embodiment, the display 10 displays a display screen that includes the light icon 46 and the touch areas 731 to 734 that enable touch operations for operating the lighting equipment 300, and from a touch operation, detects the first gesture and the second gesture that is different from the first gesture and has a fixed direction. In a case where the display 10 detects the first gesture in a touch area 731 to 734, the controller 30 executes control of the direction of the lighting equipment 300; in a case where the display 10 detects the second gesture in a touch area 731 to 734 and the second gesture has a direction away from the light icon 46, the controller 30 increases the control amount (illuminance) of the lighting equipment 300; and in a case where the display 10 detects a second gesture in a touch areas 731 to 734 and the second gesture has a direction approaching the light icon 46, the controller 30 decreases the control amount (illuminance) of the lighting equipment 300. Thus, touch operations for setting the location of the illuminated area and adjusting the illuminance become possible, and the user can intuitively operate the lighting equipment 300. As a result, it is possible to improve the operability when operating the lighting equipment 300 by touch operations on the display screen.

Note that in the present embodiment, the location of the illuminated area (illuminated location) may be adjusted by the second gesture. For example, in a case where the display 10 detects the second gesture in the touch area 731 to 734 and the second gesture has a direction away from the light icon 46, the location of the illuminated area (control amount) may be controlled so as to move away from the lighting equipment 300, and when the second gesture has a direction approaching the light icon 46, the location of the illuminated area (control amount) may be controlled so as to approach the lighting equipment 300.

Note that the images, icons, and the like included in the display screen described in the first embodiment may be displayed on the display screen in the present embodiment, and the touch operations on the display screen described in the first embodiment may be applied to the present embodiment. For example, the wave pattern display in the first embodiment may be displayed on the display screen to represent the magnitude of illuminance. Furthermore, in the present embodiment, there is one lighting equipment 300 device; however, there may be a plurality of lighting equipment 300 devices, and a plurality of touch areas may be set corresponding to each illuminated area of the plurality of lighting equipment 300 devices. In a case where the display 10 detects the first gesture in the touch area, the controller 30 may select lighting equipment from the plurality of lighting equipment 300 devices that illuminates a location corresponding to the detected touch area. Note that in a case where the display 10 detects the first gesture in the touch area, the controller 30 may execute both the selection of the lighting equipment 300 and control of the direction of the lighting equipment 300.

In addition, there does not necessarily have to be a plurality of touch areas 731 to 734, and there may be only one touch area. For example, on the display screen in FIG. 11, the entire room image may be set as one touch area. Then, in a case where the display 10 detects the first gesture in the touch area, the equipment control unit 32 controls the lighting equipment 300 so that the center of the lighting area of the lighting equipment 300 is aligned with the position where the first gesture was detected. Furthermore, in a case where the display 10 detects the second gesture in the touch area, the equipment control unit 32 controls the illuminance depending on the direction in which the second gesture moves away from or approaches a light icon 46. Thus, it is possible for the user to intuitively operate the lighting equipment 300.

Note that the touch areas 731 to 734 in this embodiment correspond to the "effective area" of the present invention.

Fourth Embodiment

Figure 12:
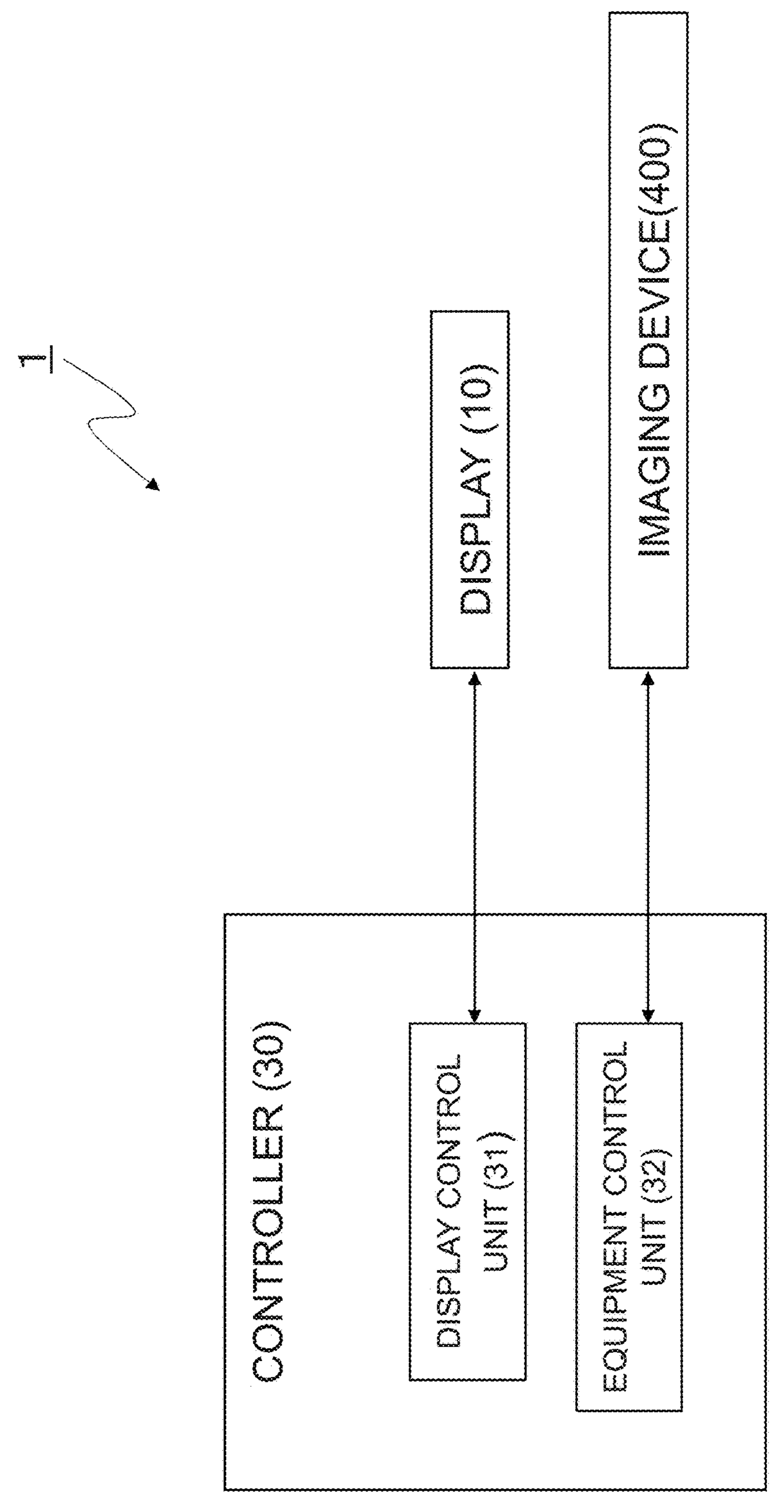
FIG. 12 is a block diagram illustrating a control system according to an embodiment of the present invention.
Figure 13:
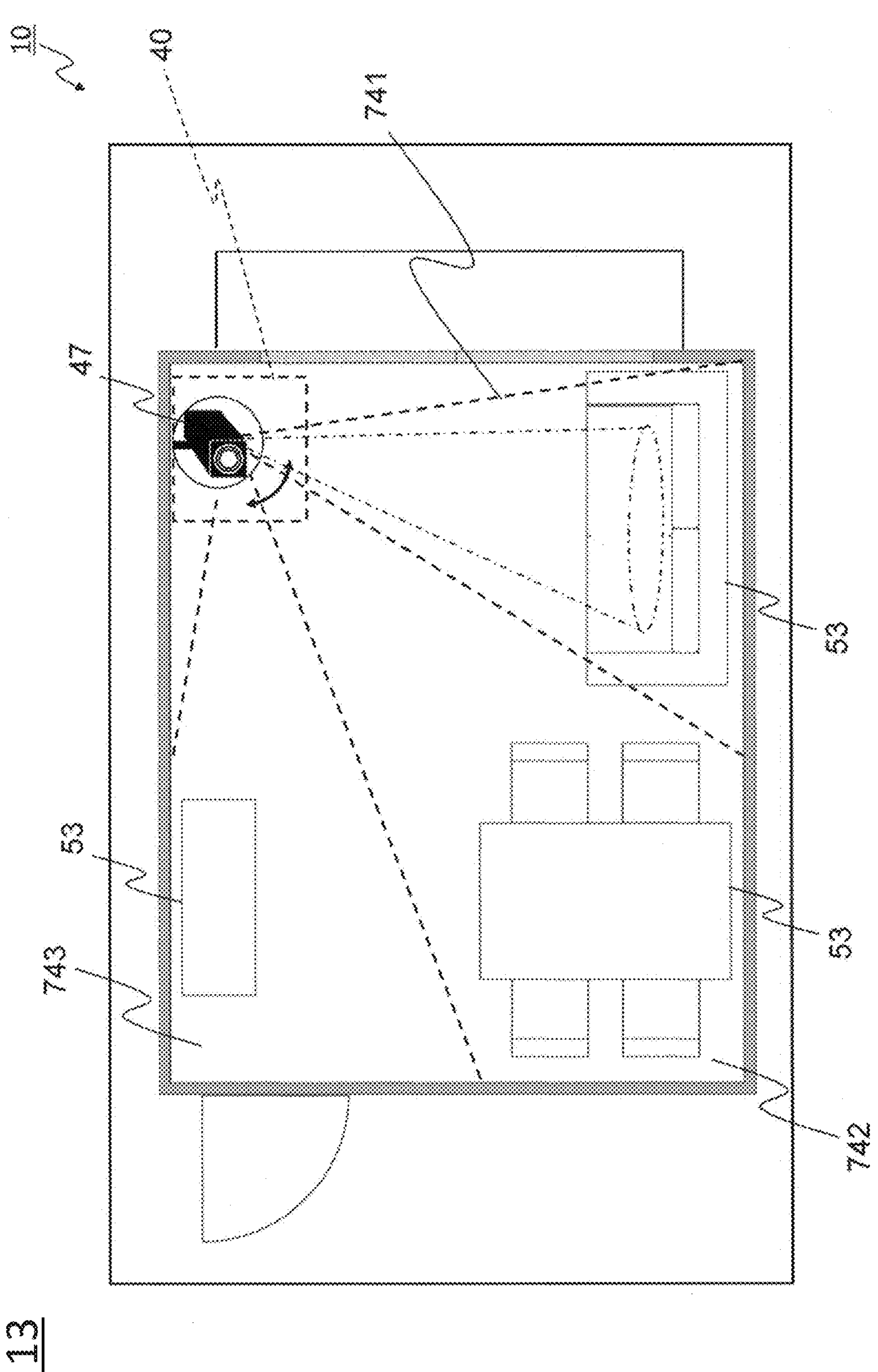
FIG. 13 is a diagram illustrating a display screen of the display in FIG. 12.

Next, a fourth embodiment of the present invention will be described. FIG. 12 is a block diagram illustrating a control system according to the fourth embodiment. FIG. 13 illustrates a display screen of the display 10, which is an operation screen for controlling an imaging device 400. The present embodiment is different from the first embodiment in that the control target is an imaging device (camera), and a part of the display screen of the display 10 and the equipment control unit 32 are different from the first embodiment. Other configurations are the same as those in the first embodiment. Hereinafter, the display control unit 31 and the equipment control unit 32 in the fourth embodiment will be explained, and the same reference numerals will be given to parts having the same configuration as in the first embodiment, and descriptions thereof will be omitted. In addition, a description of portions similar to the control process by the controller 30 in the first embodiment will be omitted. The descriptions of the first to third embodiments are appropriately incorporated into the fourth embodiment.

The display 10 is electronic equipment or the like that can be carried by a user. While carrying a terminal equipped with the display 10, the user touches the display screen of the display 10 to operate an imaging area, zoom magnification, and the like of the imaging device 400. The imaging device 400 is installed at a corner of a room, and can capture an image of the entire room or a part of the room. The location of the imaging area and the zoom magnification are adjusted under the control of the controller 30.

The equipment control unit 32 controls the imaging device 400 based on touch operations. The equipment control unit 32 specifies a control item from the content of the touch operation, and controls turning ON/OFF of lighting, location of the imaging area, zoom magnification, and the like according to the specified control item. The equipment control unit 32 outputs control commands to the imaging device 400 according to control items. The control items such as a location setting of the imaging area, a zoom magnification setting, and the like are determined in advance according to the specifications of the imaging device 400. A control item is selected by a touch operation on the display 10. In addition, the equipment control unit 32 manages the operating state and the like of the imaging device 400.

Next, with reference to FIG. 13, a control method for controlling the imaging device 400 using the display 10 and a display screen of the display 10 will be described. As illustrated in FIG. 13, the display screen of the display 10 includes a camera icon 47, a reference area image 40, and furniture images 53. The display screen illustrated in FIG. 13 displays an image of an entire room in which the imaging device 400 is installed.

The reference area image 40 is an image of a predetermined range at a corner of the display screen, and includes at least a camera icon 47. The camera icon 47 is represented by a figure resembling a camera at a corner of the display screen. In other words, the camera icon 47 is an icon that resembles the imaging device 400 that is the control target. The display screen of the display 10 includes a reference area image 40 representing a reference area and furniture images 53 representing furniture such as a sofa. The reference area image does not necessarily need to be an image that allows the user to recognize the boundaries of the reference area. Note that in the present embodiment, the camera icon 47 is located at a corner of the display screen because the imaging device 400 is installed in a corner of the room; however, the display position of the camera icon 47 may be changed as appropriate depending on the installation position of the imaging device 400.

The display screen is divided into three areas, touch areas 741 to 743, depending on the location of the furniture represented by the furniture images 53. The touch area 741 includes an image of a sofa, and is an area on the display screen in FIG. 11 extending from the position of the camera icon toward the lower right corner of the display screen. The touch area 742 includes an image of a dining table, and is an area on the display screen in FIG. 11 extending from the position of the camera icon toward the lower left corner of the display screen. The touch area 743 includes an image of a shelf, and is an area on the display screen in FIG. 11 extending from the position of the camera icon toward the upper left corner of the display screen. The touch areas 741 to 743 may be displayed as images on the display screen so that the boundaries of the areas can be seen, or they may not be so displayed. Further, the number of touch areas does not need to be three, and may be two or four or more. Moreover, the entire display screen may be used as a touch area without necessarily being divided into sections.

Next, an operation method for setting the position of the imaging area and adjusting the zoom magnification will be explained. The touch areas 741 to 743 represent areas in which touch operations for operating the imaging device 400 are enabled independently for each area. An imaging direction (imaging range) can be selected by performing a touch operation on a part of the touch areas 741 to 743 where the imaging area is desired to be set. For example, in a case where the user wants to capture an image of a dog near the sofa, the user touches the touch area 641. Note that the touch operation for setting the location of the imaging area does not need to be a directional touch operation, and may be a non-directional touch operation such as a tap. In addition, the zoom magnification can be increased or decreased depending on the direction of the directional touch operation within the touch area.

The display 10 detects a first gesture and a second gesture from touch operations in the plurality of touch areas 741 to 743. In a case where the display 10 detects the first gesture in a touch area 741 to 743, the equipment control unit 32 adjusts the direction of the imaging device 400 so that the imaging area faces a location corresponding to the detected touch area 741 to 743. For example, in a case where the display 10 detects the first gesture in the touch area 731, the equipment control unit 32 executes control of the adjustment of the imaging device 400 so that the detected location within the touch area 731 where the first gesture is detected is in focus. In a case where the display 10 detects the second gesture in a touch area 741 to 743 and the second gesture has a direction away from the camera icon 47, the equipment control unit 32 increases the zoom magnification. On the other hand, in a case where the display 10 detects the second gesture in a touch area 741 to 743 and the second gesture has a direction approaching the camera icon 47, the equipment control unit 32 decreases the zoom magnification. Thus, it is possible to adjust the zoom magnification by touch operations.

As described above, in the control system according to the present embodiment, the display 10 displays a display screen that includes a camera icon 47 and the touch areas 741 to 743 that enable touch operations for operating the imaging device 400, and from a touch operation, detects the first gesture and the second gesture that is different from the first gesture has a fixed direction. In a case where the display 10 detects the first gesture in a touch area 741 to 743, the controller 30 executes control of the direction of the imaging device 400; in a case where the display 10 detects the second gesture in a touch area 741 to 743 and the second gesture has a direction away from the camera icon 47, the controller 30 increases the control amount (zoom magnification) of the imaging device 400; and in a case where the display 10 detects a second gesture in a touch area 741 to 743 and the second gesture has a direction approaching the camera icon 47 the controller 30 decreases the control amount (zoom magnification) of the imaging device 400. Thus, touch operations for setting the location of the imaging area and adjusting the zoom magnification become possible, and the user can intuitively operate the imaging device 400. As a result, it is possible to improve the operability when operating the imaging device 400 by touch operations on the display screen.

Note that in the present embodiment, the imaging direction (location of the imaging area) may be adjusted using the second gesture. For example, in a case where the display 10 detects the second gesture in a touch area 741 to 743 and the second gesture has a direction away from the camera icon 47, the location of the imaging area (control amount) may be controlled so as to move away from the imaging device 400, and when the second gesture has a direction approaching the camera icon 47, the location of the imaging area (control amount) may be controlled so as to approach the imaging device 400.

Note that the images, icons, and the like included in the display screen described in the first embodiment may be displayed on the display screen in the present embodiment, and the touch operations on the display screen described in the first embodiment may be applied to the present embodiment. For example, the wave pattern display in the first embodiment may be displayed on the display screen to represent the size of the zoom magnification. In addition, in the present embodiment, there is one imaging device 400, but there may be a plurality of imaging devices 400, and a plurality of touch areas are set corresponding to each imaging area of the plurality of imaging devices 400. In a case where the display 10 detects the first gesture in the touch area, the controller 30 may select from among the plurality of imaging devices 400 an imaging device 400 that captures an image of a location corresponding to the detected touch area.

In addition, there does not necessarily have to be a plurality of touch areas 741 to 743, and there may be only one touch area. For example, on the display screen in FIG. 13, the entire room image may be set as one touch area. In a case where the display 10 detects the first gesture in the touch area, the equipment control unit 32 controls the imaging device 400 so that the focus of the imaging device 400 is aligned with the location where the first gesture was detected, or so that the imaging device 400 faces the location where the first gesture was detected. Furthermore, in a case where the display 10 detects the second gesture in the touch area, the equipment control unit 32 controls the zoom magnification depending on the direction in which the second gesture moves away from or approaches the camera icon 47. Thus, it is possible for the user to intuitively operate the imaging device 400.

Note that the present embodiment may be applied to electronic equipment including the imaging device 400, the controller 30, and the display 10. Electronic equipment includes smartphones and tablet terminals.

Note that the touch areas 741 to 743 in the present embodiment correspond to the "effective area" of the present invention.

Fifth Embodiment

Figure 14:
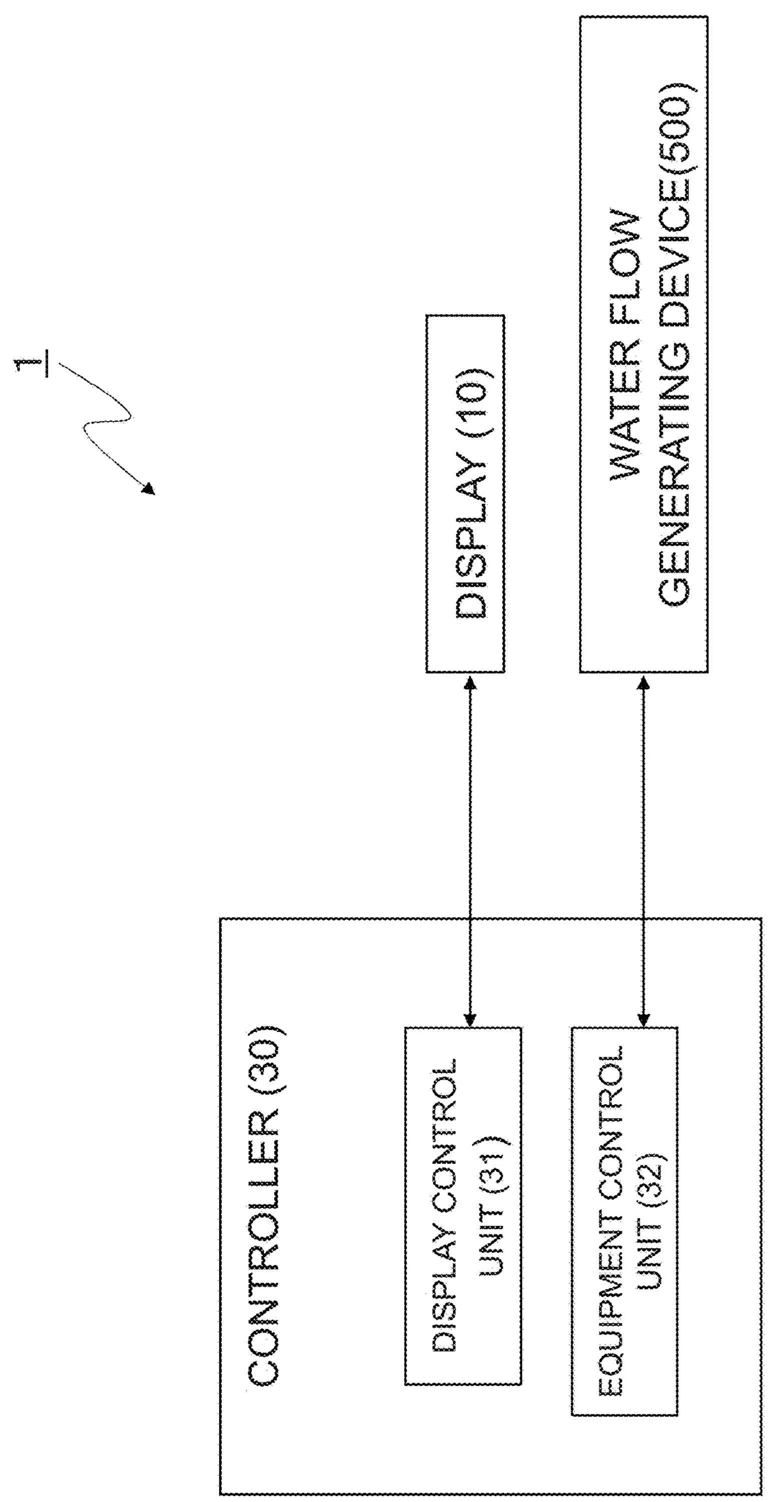
FIG. 14 is a block diagram illustrating a control system according to an embodiment of the present invention.
Figure 15:
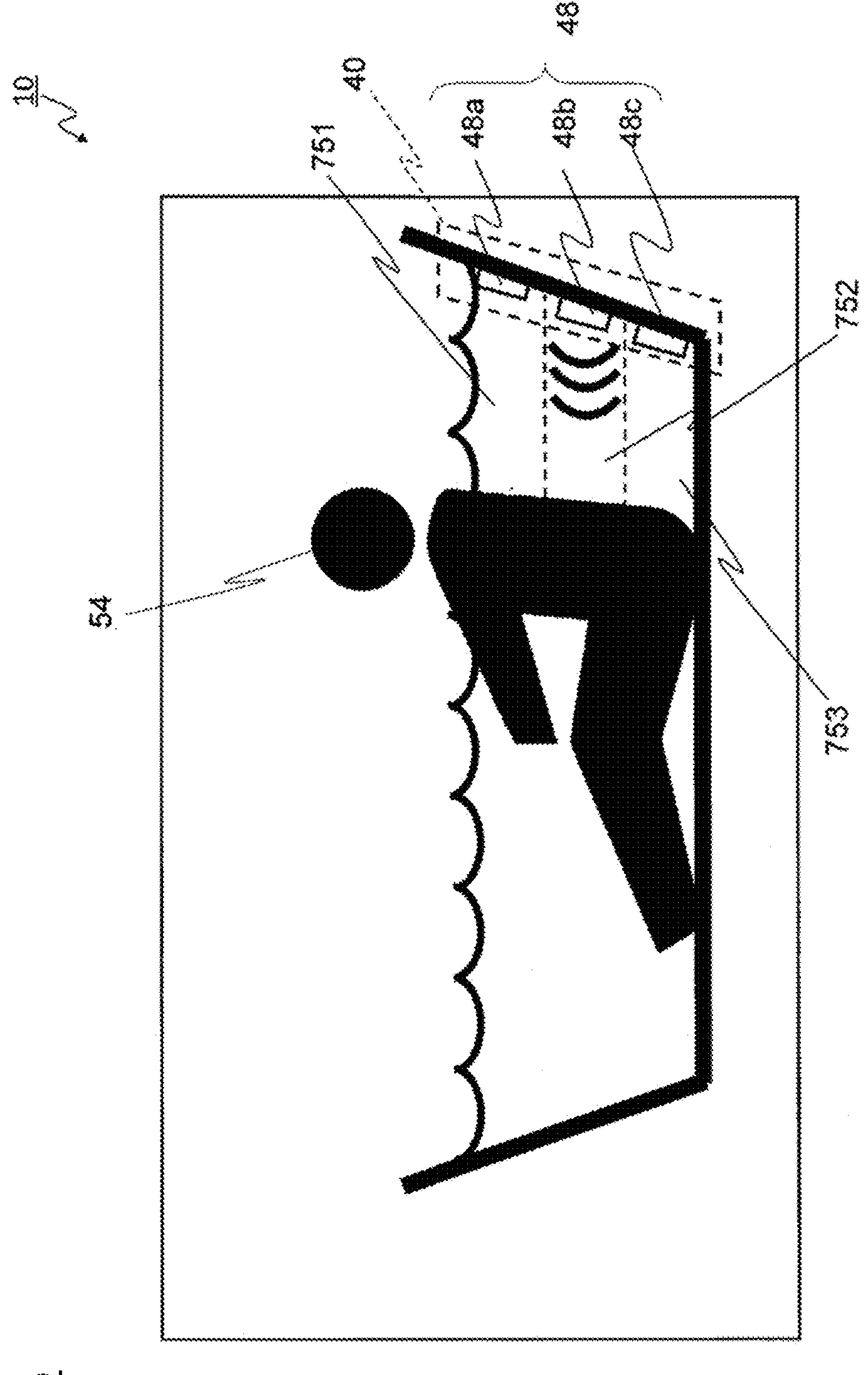
FIG. 15 is a diagram illustrating a display screen of the display in FIG. 14.

Next, a fifth embodiment of the present invention will be described. FIG. 14 is a block diagram illustrating a control system according to the fifth embodiment. FIG. 15 illustrates a display screen of the display 10, which is an operation screen for controlling a water flow generating device 500. The present embodiment is different from the first embodiment in that the water flow generating device 500 is the control target, and a part of the display screen of the display 10 and the equipment control unit 32 are different from the first embodiment. Other configurations are the same as those in the first embodiment. Hereinafter, the display control unit 31 and the equipment control unit 32 in the fifth embodiment will be explained, and the same reference numerals will be given to parts having the same configuration as in the first embodiment, and descriptions thereof will be omitted. In addition, a description of portions similar to the control process by the controller 30 in the first embodiment will be omitted. The descriptions of the first to fourth embodiments are appropriately incorporated into the fifth embodiment.

The display 10 is electronic equipment or the like that can be carried by a user. While carrying a terminal equipped with the display 10, the user touches the display screen of the display 10 to operate a discharge area, flow rate, and the like of the water flow generating device 500. The water flow generating device 500 is installed in a bathtub and can discharge water into a part of the area within the bathtub. As illustrated in FIG. 14, the water flow generating device 500 has a massage or relaxation function, and applies a strong water flow to the back, waist, and buttocks of a user sitting in a bathtub. The position of the discharge area and the flow rate are adjusted under the control of the controller 30.

The equipment control unit 32 controls the water flow generating device 500 based on touch operations. The equipment control unit 32 specifies a control item from the content of the touch operation, and controls turning ON/OFF of the device, the location of the discharge area, the flow rate, and the like according to the specified control item. The equipment control unit 32 outputs control commands to the water flow generating device 500 according to control items. The control items are determined in advance according to the specifications of the water flow generating device 500, such as a location setting of the discharge area and a flow rate setting. A control item is selected by a touch operation on the display 10. In addition, the equipment control unit 32 manages the operating state and the like of the water flow generating device 500.

Next, with reference to FIG. 15, a control method for controlling the water flow generating device 500 using the display 10, and a display screen of the display 10 will be described. As illustrated in FIG. 15, the display screen of the display 10 includes a water flow icon 48, a reference area image 40, and a user image 54. The display screen illustrated in FIG. 15 displays an image of a bathtub in which the water flow generating device 500 is installed.

The reference area image 40 is an image indicating a predetermined range within the display screen, and includes at least a water flow icon 48. The water flow icon 48 is represented on the wall of the bathtub image by a figure resembling a water flow outlet of the water flow generating device 500. In other words, the water flow icon 48 is an icon that resembles the water flow generating device 500 that is the control target. The display screen of the display 10 includes a reference area image 40 representing a reference area and a user image 50 representing a user. The reference area image 40 does not necessarily need to be an image that allows the user to recognize the boundaries of the reference area. Note that in the present embodiment, the water flow icon 48 is located on the wall of the bathtub image because the water flow generating device 500 is provided on the wall of the bathtub; however, the display location of the water flow icon 48 is changed as appropriate depending on the installation location of the water flow generating device 500.

The display screen is divided into three areas, touch areas 751 to 753, depending on a part of the body of the user illustrated in the user image 54 to which a water flow is applied. The touch area 751 includes an image of a water flow icon **48*a* that outputs a water flow onto a back, and is an area extending from an upper portion of the bathtub image toward the back on the display screen in FIG. 15. The touch area 752 includes an image of a water flow icon 48*b* that outputs a water flow onto a waist, and is an area extending from a center portion of the bathtub image toward the waist on the display screen in FIG. 15. The touch area 753 includes an image of a water flow icon 48*c* that outputs a water flow onto buttocks, and is an area extending from a lower portion of the bathtub image toward the buttocks on the display screen in FIG. 15. The touch areas 751 to 753** may be displayed as images on the display screen so that the boundaries of the areas can be seen, or they may not be so displayed. Further, the number of touch areas does not need to be three, and may be two or four or more. Moreover, the entire display screen may be used as a touch area without necessarily being divided into sections.

Next, the location of the discharge area and the operation method for adjusting the flow rate will be described. The touch areas 751 to 753 represent areas in which touch operations for operating the water flow generating device 500 are enabled independently for each area. By performing a touch operation on a portion of a touch area 751 to 753 where a water discharge area is desired to be set, a water flow outlet that generates a water flow can be selected as a control target from among a plurality of water flow outlets. For example, in a case where the user wants to apply a flow of water to the waist, the user touches the touch area 752. Note that the touch operation for setting the location of the discharge area does not need to be a directional touch operation, and may be a non-directional touch operation such as a tap. In addition, the flow rate can also be increased or decreased depending on the direction of the directional touch operation within the touch area.

The display 10 detects the first gesture and the second gesture from touch operations in the plurality of touch areas 751 to 753. In a case where the display 10 detects the first gesture in a touch area 751 to 753, the equipment control unit 32 selects the outlet that generates water flow as a control target for the touch area 751 to 753 detected by the discharge area. For example, in a case where the display 10 detects the first gesture in the touch area 752, the equipment control unit 32 selects a control target among the touch areas 751 to 753 so that the water flow bits the detected location where the first gesture was detected. In a case where the display 10 detects the second gesture in a touch area 751 to 753 and the second gesture has a direction away from the water flow icon 48, the equipment control unit 32 increases the flow rate. On the other hand, in a case where the display 10 detects the second gesture in a touch area 751 to 753 and the second gesture has a direction approaching the water flow icon 48, the equipment control unit 32 decreases the flow rate. Thus, it is possible to adjust the flow rate by touch operations.

As described above, in the control system according to the present embodiment, the display 10 displays a display screen that includes the water flow icon 48 and the touch areas 751 to 753 that enable touch operations for operating the water flow generating device 500, and from a touch operation, detects the first gesture and the second gesture that is different from the first gesture and has a fixed direction. In a case where the display 10 detects the first gesture in a touch area 751 to 753, the controller 30 executes control of the selection of the control target; in a case where the display 10 detects the second gesture in a touch area 751 to 753 and the second gesture has a direction away from the water flow icon 48, the controller 30 increases the control amount (flow rate) of the water flow generating device 500; and in a case where the display 10 detects the second gesture in a touch area 751 to 753 and the second gesture has a direction approaching the water flow icon 48, the controller 30 decreases the control amount (flow rate) of the water flow generating device 500. Thus, touch operations for setting the position of the discharge area and adjusting the flow rate become possible, and the user can intuitively operate the water flow generating device 500. As a result, it is possible to improve the operability when operating the water flow generating device 500 by touch operations on the display screen.

Note that, in the present embodiment, the discharge direction may be adjusted by the first gesture. For example, in a case where the water flow generating device 500 has a function of changing the direction of the water flow generated in the bathtub, and the display 10 detects a first gesture in a touch area 751 to 753, the controller 30 controls the water flow generating device 500 to direct the water flow in the direction of the area where the first gesture is detected. At this time, there does not necessarily have to be a plurality of touch areas 751 to 753, and there may be only one touch area. Thus, touch operations for adjusting the direction of water flow become possible, and the user can intuitively operate the water flow generating device 500. Note that in a case where the display 10 detects the first gesture in the touch area, the controller 30 may execute both the selection of the water flow generating device 500 and control of the direction of the water flow generating device 500.

Note that the images, icons, and the like included in the display screen described in the first embodiment may be displayed on the display screen in the present embodiment, and the touch operations on the display screen described in the first embodiment may be applied to the present embodiment. For example, the wave pattern display in the first embodiment may be displayed on the display screen to represent the magnitude of the flow rate.

Note that the touch areas 751 to 753 in the present embodiment correspond to the "effective area" of the present invention.

Note that the embodiments described above are described to facilitate understanding of the present invention, and are not described to limit the present invention. Therefore, each element disclosed in the above embodiments is intended to include all design changes and equivalents that fall within the technical scope of the present invention.

DESCRIPTION OF REFERENCE NUMERALS

1 Control system
10 Display
11 Main switch button
12 Mode switch button
13 Steering wheel icon
20 air conditioner
30 Controller
31 Display control portion
32 Equipment control system portion
40 Reference area mage
50 Scat image
51 Right seat image
52 Left seat image

The invention claimed is:

1. An equipment control device, comprising a controller that controls a control target based on a touch operation by a user on a touch panel display; wherein the display displays a display screen that includes a control target icon resembling the control target, and a plurality of touch areas that enables the touch operation for operating the control target; and detects a first gesture and a second gesture from the touch operation, the second gesture being different from the first gesture, and having a fixed direction; and the controller in a case where the display detects the first gesture in any one of the plurality of the touch areas, executes at least one of selecting the control target and controlling a direction of the control target; in a case where the display detects the second gesture in the one touch area that has been detected, and the second gesture has a direction away from the control target icon, increases a control amount of the control target corresponding to a positional relationship in the display screen between the one touch area and the control target icon; in a case where the display detects the second gesture in the one touch area that has been detected, and the second gesture has a direction approaching the control target icon, decreases a control amount of the control target corresponding to a positional relationship in the display screen between the one touch area and the control target icon; wherein the plurality of touch areas, are located between a reference area image including the control target icon and a seat image, are divided into an area between the reference area image and the chest portion of the seat image, an upper area between the reference area image and the head portion of the seat image, and a lower area between the reference area image and the bottom of the seat image, and is an area for operating an airflow from a front air outlet toward the seat, the upper area is an area for operating a defroster, and the lower area is an area for operating an airflow from a lower air outlet toward the seat.

2. The equipment control device according to claim 1, wherein the controller orients a direction of the control target toward a location corresponding to an area where the first gesture is detected among the plurality of the touch areas.

3. The equipment control device according to claim 1, wherein the first gesture is a tap or hovering.

4. The equipment control device according to claim 1, wherein the second gesture is a swipe or a flick.

5. The equipment control device according to claim 1, wherein the touch areas are adjacent to the control target icon.

6. The equipment control device according to claim 1, wherein the display screen includes a user position icon indicating a position of the user, and the touch areas are arranged between the control target icon and the user position icon.

7. The equipment control device according to claim 1, wherein the display screen includes a right seat image representing a right seat and a left seat image representing a left seat; and the seats represented by the right seat image and the left seat image face the control target icon on the display screen.

8. The equipment control device according to claim 1, wherein the control target is audio equipment, and the control amount is a sound location or volume of a sound output from the audio equipment.

9. The equipment control device according to claim 1, wherein the control target is an air conditioner, and the control amount is a direction or airflow of air output from the air conditioner.

10. The equipment control device according to claim 1, wherein the control target is lighting equipment, and the control amount is illuminance or illuminated location of the lighting equipment.

11. The equipment control device according to claim 1, wherein the control target is an imaging device, and the control amount is an imaging direction or a zoom magnification of the imaging device.

12. The equipment control device according to claim 1, wherein the control target is a water flow generating device, and the control amount is a direction or flow rate of water flow output from the water flow generating device.

13. The equipment control device according to claim 1, wherein the controller outputs a control command that causes the display to display an image indicating the control amount.

14. The equipment control device according to claim 1, wherein the control target is a device mounted in a vehicle, and the display screen, in a case where the traveling direction of the vehicle is taken to be the front, includes a right seat image representing a right seat and a left seat image representing a left seat.

15. The equipment control device according to claim 1, wherein each of the plurality of the touch areas corresponds to at least one of the selecting the control target or controlling the direction of the control target based on the positional relationship with the control target icon on the display screen.

16. The equipment control device according to claim 1, wherein the plurality of the touch areas is divided in a height direction of the display into a predetermined area, an upper area located above the predetermined area, and a lower area located below the predetermined area.

17. The equipment control device according to claim 1, wherein the control target icon is a speaker icon, and the plurality of the touch areas is divided into am area between a reference area image including the speaker icon and a right seat image and an area between the reference area image and a left seat image.

18. The equipment control device according to claim 1, wherein the control target icon is a light icon, and the plurality of the touch areas is divided depending on a position of a furniture image.

19. The equipment control device according to claim 1, wherein the control target icon is a camera icon, and the plurality of the touch areas is divided depending on a position of a furniture image.

20. The equipment control device according to claim 1, wherein the control target icon is an icon for resembles a water flow generating device, and the plurality of the touch areas is divided depending on depending on a part of the body of the user to which a water flow is applied.

21. The equipment control device according to claim 1, wherein the plurality of touch areas are located between a reference area image including the control target icon and a seat image.

22. Electronic equipment comprising:

the equipment control device according to claim 1;

the display; and an imaging device as the control target.

23. A program for causing a computer to achieve: a function of causing a touch panel display to display a display screen that includes a control target icon that resembles a control target and a plurality of touch areas that enables touch operations for operating the control target; a function of detecting, a first gesture and a second gesture from a touch operation on the display, the second gesture being different from the first gesture and having a fixed direction; a function that, in a case where the display detects the first gesture in any one of the plurality of touch areas, executes at least one of selecting the control target and controlling a direction of the control target corresponding to a positional relationship in the display screen between the one touch area and the control target icon; a function that, in a case where the display detects the second gesture in the touch areas and the second gesture has a direction away from the control target icon, increases a control amount of the control target corresponding to a positional relationship in the display screen between the one touch area and the control target icon; and a function that, in a case where the display detects the second gesture in the one touch area and the second gesture has a direction approaching the control target icon, decreases a control amount of the control target corresponding to a positional relationship in the display screen between the one touch area and the control target icon, wherein the plurality of touch areas, are located between a reference area image including the control target icon and a seat image, are divided into an area between the reference area image and the chest portion of the seat image, an upper area between the reference area image and the head portion of the seat image, and a lower area between the reference area image and the bottom of the seat image, and is an area for operating an airflow from a front air outlet toward the seat, the upper area is an area for operating a defroster, and the lower area is an area for operating an airflow from a lower air outlet toward the seat.

24. An equipment control method of controlling a touch panel display and a control target, the equipment control method comprising: displaying on the display a display screen that includes a control target icon that resembles the control target and a plurality of touch areas that enables touch operations for operating the control target; detecting a first gesture and a second gesture from a touch operation on the display, the second gesture being different from the first gesture and having a fixed direction; in a case where the display detects the first gesture in any one of the plurality of the touch areas, executing at least one of selecting the control target corresponding to a positional relationship in the display screen between the one touch area and the control target icon and controlling a direction of the control target; in a case where the display detects the second gesture in the one touch area that has been detected, and the second gesture has a direction away from the control target icon, increasing a control amount of the control target corresponding to a positional relationship in the display screen between the one touch area and the control target icon; and in a case where the display detects the second gesture in the one touch area that has been detected, and the second gesture has a direction approaching the control target icon, decreasing a control amount of the control target corresponding to a positional relationship in the display screen between the one touch area and the control target icon, wherein the plurality of touch areas, are located between a reference area image including the control target icon and a seat image, are divided into an area between the reference area image and the chest portion of the seat image, an upper area between the reference area image and the head portion of the seat image, and a lower area between the reference area image and the bottom of the seat image, and is an area for operating an airflow from a front air outlet toward the seat, the upper area is an area for operating a defroster, and the lower area is an area for operating an airflow from a lower air outlet toward the seat.

* * * * *